United States Patent
Hsu et al.

(10) Patent No.: US 6,700,097 B1
(45) Date of Patent: Mar. 2, 2004

(54) ELECTRIC ARC WELDER AND CONTROLLER TO DESIGN THE WAVEFORM THEREFOR

(75) Inventors: Christopher Hsu, Mentor, OH (US); Steven R. Peters, Huntsburg, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 104 days.

(21) Appl. No.: 09/965,327

(22) Filed: Sep. 28, 2001

(51) Int. Cl.⁷ .................................................. B23K 9/10
(52) U.S. Cl. ................................ 219/130.5; 219/130.51
(58) Field of Search .......................... 219/130.5, 130.31, 219/130.32, 130.33, 130.51, 137 PS, 136

(56) References Cited

U.S. PATENT DOCUMENTS

| | | | |
|---|---|---|---|
| 5,278,390 A | 1/1994 | Blankenship | |
| 6,002,104 A | 12/1999 | Hsu | |
| 6,111,216 A | 8/2000 | Stava | |
| 6,207,929 B1 | 3/2001 | Stava et al. | |
| 6,291,798 B1 | 9/2001 | Stava | |
| 6,486,439 B1 * | 11/2002 | Spear et al. | 219/136 |

OTHER PUBLICATIONS

T. Siewert et al., "Internet Based Management of Data From Welding Sensors", NIST Publication 949, Ninth International Conference on Computer Technology in Welding, May, 2000, pp. 247–252.*

* cited by examiner

*Primary Examiner*—Clifford C. Shaw
(74) *Attorney, Agent, or Firm*—Fay, Sharpe, Fagan, Minnich & McKee

(57) ABSTRACT

An electric arc welder for creating a welding cycle with a real time current waveform constituting several control parameters by a microprocessor that controls a power supply by a signal so the output of the power supply traces a desired waveform and dynamic reaction behavior to arc conditions defined by the control parameters. The welder has a controller for creating the signal and reading the parameters, a graphic user interface program controlled by input from a graphic user interface computer, a system with a first interface for an interactive display for displaying the desired waveform and dynamic behavior and at least one manipulative control parameter, a second interface for a manual data entry device to change the waveform and/or the parameters and a digital communication link from the graphic user interface to the welder microprocessor controller for causing the welder to perform the desired waveform by controlling the signal. A number of script language files each defining a given type of waveform logic and containing a user manipulative variable table of control parameters and graphical descriptive language to display a waveform to be implemented by the welder is used with an input stage for processing a selected one of the script files into graphic user interface components (readouts, charts, and/or panels) for operating the welder.

84 Claims, 12 Drawing Sheets

ELECTRIC ARC WELDER AND CONTROLLER TO DESIGN THE WAVEFORM THEREFOR

The present invention relates to the art of electric arc welding with a welder having a power supply of the switching type and more particularly to an electric arc welder of this type combined with a novel and unique controller to design the waveform.

BACKGROUND OF INVENTION AND INCORPORATION BY REFERENCE

Electric arc welding involves the movement of an electrode toward a workpiece while current is passed through the electrode and across an arc between the electrode and workpiece. Although some electric arc welders utilize a non-consumable electrode, most of the mass production arc welding involves an electrode which is consumed during the welding process whereby the electrode is melted by the arc and deposited on the workpiece. Thus, an arc welding process includes variable process characteristics, such as wire speed or electrode speed, gas composition, electrode diameter and workpiece metal. The actual electrical arc welding process at the production site takes into consideration these characteristics and involves a non-linear complex control system which determines the applicable metal transfer mode and the electrical parameters of the power supply performing the welding process. In order to achieve desirable results, a waveform is selected having several control parameters, which waveform is customized for the exact condition of each welding application. Thus, controlling arc welding has become an art which demands substantial knowledge and experience to select a waveform having several control parameters to produce an optimum welding process. A large number of controllers have been developed for use with electric arc welders that have real time current waveforms developed by welding engineers to optimize the welding process performed in the field. To accomplish this objective, a microprocessor based controller has been developed and is now used that allows an operator in the field to select one of many welding waveforms by merely using one of several overlays. This successful microprocessor based controller is illustrated in Blankenship U.S. Pat. No. 5,278,390 that is incorporated by reference herein. By using a known template for the controller, an operator selects a welding waveform having the desired control parameters especially developed for the selected weld process by a skilled welding engineer. This successful controller had a certain amount of adjustability in the field; however, such on-site adjustments were limited. Mass production use of arc welders has created a demand for the ability to conveniently adjust certain control parameters of the welding waveform in the field, especially when the welding process conditions are different than what is used in designing standard waveforms shipped with the welders (such as cable length, shielding gas and welding wire). Thus, there was a need for a controller to be used with an electric arc welder, where the controller can process a desired waveform that is adjusted interactively at the manufacturing site so the waveform is optimized for welding conditions and welding requirements for the job.

To fill this need, an electric arc welder was developed with a microprocessor based controller for the specific arc welder. This welder is shown in Hsu U.S. Pat. No. 6,002,104 incorporated by reference herein. The welder has a switching type power supply for creating a welding cycle, with a real time current waveform constituting several control parameters by rapidly switching a D.C. current in a controlled fashion by a pulse width modulator and it will be described with respect to such switching type power supply. This prior patented controller was used with various switching type power supplies normally used in electric arc welders; however, the Hsu patent shows a down chopper power supply for simplicity. In practice, an inverter type power supply having a waveform controlled by a pulse width modulator was controlled in accordance with the present invention. The microprocessor based controller included means for displaying a waveform generated on an electrically operated waveform screen, such as a CRT. In this manner, the operator at the production site viewed the actual waveform to be processed by the electric arc welder under the direction of the patented controller. Interactive means were employed for manually adjusting at least a portion of the waveform displayed on the waveform screen to generate a new waveform operating on the waveform screen and having the desired control parameters. Consequently, a prebuilt waveform was first displayed on the CRT, normally in a graph exhibiting current versus time. To change one of the control parameters, such as background current, peak current, current ramp, etc., a manual adjustment of the prebuilt waveform was performed manually and interactively on the waveform screen. In this manner, a new current waveform was exhibited on the waveform CRT screen. In accordance with somewhat standard practice, before the patented arc welder the pulse width modulator of the power supply was controlled in accordance with the newly created current waveform to cause the power supply itself to generate a welding cycle with the real time waveform corresponding to the new waveform on the waveform screen. The welder power supply executed the new control parameters exhibited as control parameters in the new waveform. In this manner, a desired waveform was exhibited and used by the electric arc welder. If there was a need to change a control parameter of the exhibited waveform, the waveform itself was modified visually by the operator on site and then employed for control of the electric arc welder. This interactive changing of the waveform, as it was visually displayed on a waveform screen, was novel to the welding field and was implemented by including a JAVA virtual machine with a welder control application program or an applet running within a browser in JAVA language. The JAVA control program was dedicated to the specific electric arc welder combined with the controller. Thus, the consumer product was an electric arc welder having a power supply with a microprocessor based controller that was driven by a program in JAVA language. This concept was accomplished by using a JAVA virtual machine as part of the on site controller. This new electric arc welding was interactively manipulated to create a waveform for controlling the actual real time waveform of the welding process. The controller performed its functions through real time adjustment of the pulse width modulator used in the switching power supply driving the welder.

In a welder using the patented technology of Hsu U.S. Pat. No. 6,002,104 the welder has a microprocessor with a JAVA virtual machine and controlled by at least one control application program in JAVA language. The program was dedicated to the particular welder being controlled. The microprocessor system included hardware with a first interface for an interactive display screen and a second interface for a manual data entry device, such as mouse or keyboard, that was used interactively to change the waveform on the display screen preparatory to the waveform being implemented on a digital communication link (such as ethernet or infrared) for outputting control parameters to the welder. The same communication channel was used to input operating parameters from the welder. In this manner, the electric welder was controlled by manual manipulation of the actual waveform to be used in the welding process preparatory to implementation of the welding process. As changes are required, certain control parameters were adjusted on the display screen to merely change the shape of the waveform being displayed. When the operating parameters from the welder were inputted to the microprocessor of the controller, a separate "scope" application program in JAVA language was selected and implemented by the controller. In this manner, the CRT of the controller was converted from a waveform editor to an oscilloscope display for reading parameters from the welder and for displaying these parameters as a soft oscilloscope on the face of the controller. The scope display used a window separate and distinct from the window used for editing the waveform. The screen of the controller was used to display either the waveform processed by the waveform editor application program or the oscilloscope plots processed by the scope application program. Both programs were processed by the JAVA virtual machine which was a part of the welder. The application programs were loaded into the virtual machine by a CD ROM that is loaded at the factory to program each of the welders preparatory to delivery. The physical media of distributing the JAVA object code or bytecode from the welding manufacturer to the customer used other forms, such as a floppy diskette, E-mail, web page and down loading by a modem. To change the operation program for the welders in the field, the patented welder periodically updated the control application program and/or the scope application program of the welders by a new CD ROM or by an Internet feed.

The patented controller of Hsu U.S. Pat. No. 6,002,104 displayed on its screen a waveform series of read out devices adjacent the waveform screen. A series of control parameters for the waveform were displayed adjacent the waveform screen, as read out values. The waveform was displayed on the waveform screen and contained a series of control parameters, some of which were recorded as read out values on the face of the controller adjacent the waveform screen. This total display is shown in FIG. 2 and is referred to as the graphic user interface or GUI. This display is used interactively to modify the waveform. The variable tables and waveform logic is provided by the memory stack as shown in FIG. 4. As an example of the display usage, the peak current of the waveform is displayed in an alpha numerical numbers on the face of the controller. As the waveform was modified interactively on the screen, the read but value was automatically changed accordingly. In addition, by adjusting one or more of the displayed control parameters at the read out device, the waveform itself was changed accordingly. The displayed control parameters, shown in the read out devices, had corresponding lock control parameter means for manually locking the display control parameters at preselected read out values. In this manner, the waveform was adjusted to change the value of a locked out control parameter. The prior art controller included a first override that was implemented to limit the value of one or more of the control parameters. In other words, if maximum current of the welder was at a set point, the control program processing a given waveform would prevent adjustment, either interactively or by a read out device, of the current to a level above the set maximum level. The same concept was used with a relational constraint wherein there is a fixed relationship of one control parameter to another control parameter. This fixed relationship was maintained. In this fashion, when one of the control parameters was adjusted, the other parameter is adjusted accordingly to maintain the set, fixed relationship. These are schemes utilized in the prior art patented welder to constrain the interactive manipulation of the waveform on the waveform screen or adjustment of the waveform through read out devices on the face of the controller. The JAVA virtual machine of the prior controller is provided with two or more application programs that are stand alone and can be selected by the operator who selects one or the other programs to be executed. The hardware of the controller includes a mouse or keyboard which latches onto certain points on the displayed waveform and allows the points to be moved or dragged in accordance with standard microprocessor operation. Consequently, there were graphically manipulating current waveforms for an arc welder in real time using JAVA technology. The welder monitors the actual waveform of the welder by analyzing operating parameters and using measurable electrical signals, such as arc current and voltage, derivative signals, such as impedance, power and energy, and process modes of operation. By using this concept, the operating signals or parameters from the welder itself were used to display and apply impedance of the arc and cable and instantaneous power of the arc and cable. Average current and voltage are sampled at a fixed rate and the welding time and the accumulated energy were also capable of being displayed in real time. If the optional scope program was employed, the output waveform created on the screen was analyzed and numerical data was displayed from various aspects of the displayed operating parameters. Other aspects of the actual operating condition of the welder were displayed and analyzed by using the scope program of the controller, not forming a part of the present invention.

In the prior art electric arc welder patented in Hsu U.S. Pat. No. 6,002,104, the processing logic was fixed and inflexible so that only certain types of waveforms pre-built into the program could be processed. For instance, a fixed wave shape template was selected for display and manipulation. See FIG. 3. The basic aspects of the template were fixed logic. Thus, the welder with a JAVA virtual machine could only select fixed templates for processing of specific current waveforms. There was no ability to select from a memory location certain data and display this as a waveform in a manner to change the behavior of the waveform template. In the prior art unit, the weld program compiled as object code or bytecodes was fixed to manipulate a fixed waveform logic of FIG. 4. If the waveform in FIG. 4 is changed, the JAVA source code must be changed to support the new waveform logic.

THE INVENTION

The present invention relates to the concept of creating a welding waveform script language used to specify waveform parameters exposed to the user as user variables for interaction with the graphic user interface shown in FIG. 2. A series of script language files written by script language presents waveforms graphically from a subset of parameters, constraints and display characteristics of the parameters. By using the script language or script files, the user variables and graphic constraints are directly processed by a graphic user interface (GUI) computer platform which in practice contains a JAVA virtual machine communicated with the operating system and hardware of the welder. By using the:script language, the relationship of the user variables are converted to data understood by the welder. Consequently, there is provided a user friendly programming digital welding system using script to draw any waveform as opposed to an operating program with pre-built waveforms. In accordance with one aspect of the invention, the welding waveform script file is compiled into a JAVA object code in the form of bytecodes. The JAVA bytecodes are processed in run time by the main operating JAVA program. When using the compiled script, the program is fixed; therefore, it is stable, general purpose and independent of the logic of each welding process.

In accordance with the invention, the welding waveform script language has a first section dedicated to user variables which are the parameters some of which are displayed on the read out portion of the CRT. The variable table for parameters are a subset of the fixed tables and logic of the stack in FIG. 4. This subset allows interaction on the graphic user interface of FIG. 2. The other portion of the welder waveform script language is the logic graphic construction which constructs the waveform on the graphic user interface to display the waveform for interactive manipulation by user as explained in Hsu U.S. Pat. No. 6,002,104. In each instance, the interactive manipulation as shown in Hsu U.S. Pat. No. 6,002,104, is processed in accordance with the present invention; however, this processing of welding process logic is separate from the main application and is driven by script language as opposed to fixed logic contained within the application.

By using script language, the interface with the operator allows adjustment of the waveform as well as the parameters in direct communication without the rigidity necessary in preprogrammed GUI designs.

In accordance with the present invention, an electric arc welder for creating a welding cycle with a real time current waveform constituting several parameters by switching a power supply in a controlled fashion under the control of a signal so the output of the power supply traces a desired form and dynamic reaction behavior to arc conditions defined by the control parameters. The switching of the power supply is by a pulse width modulator. This welder has a microprocessor controller for creating the signal and for reading the parameters. An operating computer system controlled by input from a dedicated computer program is combined with a system with a first interface for an interactive display for displaying the desired waveform and at least one manipulative control parameter and a second interface for a manual data entry device to change the waveform and/or the parameters. A digital communication link (such as ethernet or infrared) from the system causes the welder to perform the desired waveform by controlling the waveform controlling signal. There is provided a number of script language files each of which defines a given type of waveform and containing user manipulative variable table of control parameters and a graphic construction program to display a waveform to be manipulated by the welder. The script language file constitutes the primary aspect of the present invention. The welder has an input stage for directing a selected one of the script files to the GUI computer for operating the welder the various script language files. These files are individually processed for direct interactive communication with the operator of the welder to change the parameters and waveform before the waveform is used by the welder.

In accordance with another aspect of the present invention, the GUI computer contains a JAVA virtual machine and the input stage is either a compiler for converting the selected file to JAVA bytecodes or a script interpreter for directly processing the script file in run time. In accordance with another aspect of the present invention, both the interpreter and compiler is used for processing script language.

In accordance with another aspect of the present invention there is provided a method for controlling an electric arc welder for creating a welding cycle with a real time current waveform constituting several control parameters by switching power supply in a control fashion under the control of a signal so the output of the power supply traces a desired waveform and/or dynamic reaction behavior dictated by arc conditions defined by the control parameters. This welder has a microprocessor controller for creating the signal and for reading of the parameters. The method comprises providing a graphic user interface (GUI) program controlled by input from a GUI computer, providing a system with a first interface for an interactive display to display the desired waveform and at least one manipulative control parameter, a second interface for a manual data entry device to change the waveform and/or one of the parameters and a digital communication link for causing the welder to perform the desired waveform by controlling the signal, providing a number of script language files each defining a given type of waveform logic and containing a user manipulative variable table for control parameters and/or a graphic descriptive language to display a waveform to be implemented by the welder processing at least one of the script files to the GUI computer for operating the welder. The script files are converted into GUI components (read out, dynamic charts, panels to be loaded into a GUI program). The computer preferably contains a JAVA virtual machine which receives the data from the script language files either as compiled bytecodes or as interpreted text file.

In accordance with another aspect of the present invention, there is provided an electric arc welder for creating a welding cycle with a real time current waveform constituting several control parameters by switching a power supply in a controlled fashion under control of a signal, such as by a pulse width modulator, so the output of the power supply traces a desired waveform and dynamic reaction behavior to arc conditions in accordance with variables and waveform logic. The welder has a microprocessor controller with a computer operating program for creating the waveform control signals and reading at least some of said parameters. A number of script language files each defining a given waveform and containing a variable table and waveform logic in script language are compiled to convert the variable table to data structure native to the computer program and the waveform logic into native code of the computer program and a stage to use the variable table code and the waveform logic code to operate the power supply of the welder.

In the broadest sense, the power supply is a microprocessor controlled power supply for arc welding. In practice, it is a switching power supply controlled by a pulse width modulator under control of a signal from the microprocessor controller. The type of controller is not determinative of the invention.

In accordance with another aspect of the present invention, there is provided a novel graphic user interface for controlling and/or monitoring a welding process. The interface comprises at least one graphical widget defined by a scripting file loaded in run-time. The widget can be a slider, a text box, a switch, a choice, an intermediate chart, a button, a panel and combinations thereof.

The primary object of the present invention is the provision of a controller for an electric arc, which controller allows manipulation of a waveform on a screen for the purpose of changing the waveform to be used to determine operation of the welder wherein the waveform design and manipulation of behavior specified by scripting language file. Such control is preferably implemented by a JAVA virtual machine.

Another object of the present invention is the provision of a controller, as defined above, which controller can read the operating parameters of the welder to display the waveform and various operating parameters and allowing simplified operator manipulation of the display parameters and the waveform.

Still a further object of the present invention is the provision of an arc welder, as defined above, which welder incorporates a virtual machine as a stand alone application or as an applet within a browser used in the controller.

Still another object of the present invention is the provision of a method of operating an electric arc welder utilizing the scripting language for interaction by the operator and the controller to process displayed waveforms and displayed parameters.

Another object of the present invention is the provision of an electric arc welder and method, as defined above, which welder and method has the capability of modifying the logic of the waveform to construct the desired waveform without the constraints in the prior art, as shown in Hsu U.S. Pat. No. 6,002,104.

Yet a further object of this invention is a welder and method as defined above, which welder and method uses a scripting language program to both control a graphical user interface for interactive use and a load variable parameter table and waveform logic directly into the control program associated with the welder.

These and other objects and advantages will become apparent from the following description taken together with the accompanying drawings.

PREFERRED EMBODIMENT OF THE INVENTION

Figure 1:
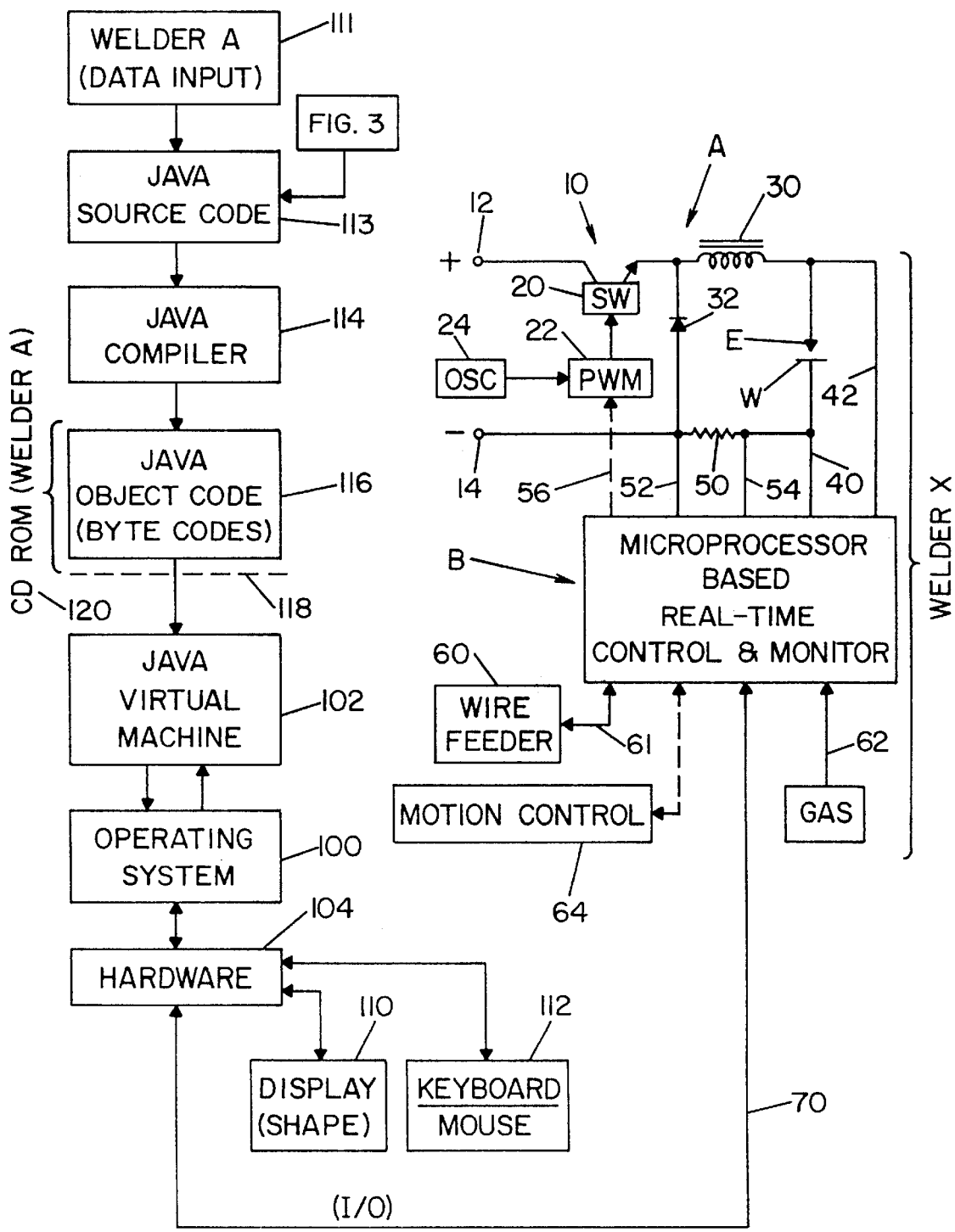
FIG. 1 is a control architecture of a controller and electric arc welder with a stand alone implementation of JAVA technology as disclosed in Hsu U.S. Pat. No. 6,002,104 and used for practicing the preferred embodiment of the present invention.

Referring now to the drawings, wherein the showings are for the purpose of illustrating the preferred embodiment of the present invention and not for the purpose of limiting same, FIG. 1 shows the prior art of Hsu U.S. Pat. No. 6,002,104. An electric arc welder A controlled by a somewhat standard microprocessor based controller B which is a real time control and monitor for welder A. Controller B is combined with welder A as a commercial product purchased for use in various welding processes, especially for mass production welding of consumer products, which welding is often done by a robot. The stand alone unit incorporating welder A and controller B uses any of a number of switching type power supplies, such as an inverter generally illustrated in Blankenship U.S. Pat. No. 5,349,157 or a buck converter or down chopper as generally shown in Stava U.S. Pat. No. 4,952,064. For the purposes of simplicity, welder A is shown as including a down chopper as part of power supply 10 which is used to switch a D.C. current at terminals 12, 14 in accordance with the operation of a switch 20. In practice, an inverter or a buck converter is used with a plurality of switches or switches arranged in various configurations. A simplified switching type power supply utilizes switch 20 controlled by a pulse width modulator 22 driven at a pulse rate determined by oscillator 24, which pulse rate is normally 10 to 20 kHz and preferably approximately 20 kHz. Current pulses occur at a rapid rate and are directed through a relatively small inductor 30 to perform a welding process implemented between electrode E, normally in the form of an advancing welding wire, and workpiece W. The duty cycle of the various pulses of switch 20 is controlled by pulse width modulator 22 so that the waveform of the current in the welding process between electrode E and workpiece W is accurately controlled and repeated consistently. In accordance with standard practice, welder A has a freewheeling diode 32, an arc voltage sensor for creating a voltage across lines 40, 42 and a current shunt 50 for creating a voltage across lines 52, 54 representative of the arc current. The voltages across lines 40, 42 and lines 52, 54 are directed to the input of controller B for the purpose of monitoring the welding process, which process is controlled by the voltage on line 56 that changes in a real time fashion to follow the shape of a waveform governing the welding cycle of welder A. In accordance with standard practice, electrode E is an advancing welding wire represented as a wire feed device 60 having a speed controlled by and monitored by controller B as indicated by line 61 or a fixed electrode is used, such as TIG welding. The welding process performed by welder A is modified according to the shielding gas employed in the welding process. The shielding gas is identified by data on line 62. When welder A is used for an automatic welding processes, such as robotic processes, the welding head is moved on a real time basis in accordance with a program in controller B that operates motion control device 64 in accordance with standard practice. The present invention relates to the control of welder A during the welding process. In the prior art, the control was not necessarily to the individual control of orientational coordinates of the welding gun and the speed of the movement of the welding gun as schematically illustrated by motion control 64. In the present invention, such motion control is manipulated by the operator through use of script language. As so far described, welder A is standard and controller B is a device well known in the art and known to manufacturers of electric arc welders having microprocessor based controllers. One such controller is generally illustrated in Blankenship U.S. Pat. No. 5,278,390. The command signal on line 56 is analog; however, in the invention, the command signal to control the shape of the waveform is either analog or digital format.

The power supply is shown as having a single polarity. By adding a second output network, the weld process is in two polarities, i.e. positive and negative. See Stava U.S. Pat. No. 6,111,216; Stava U.S. Pat. No. 6,207,929; and Stava U.S. Pat. No. 6,291,798, incorporated by reference herein.

Controller B is operated by the logic on I/O conduit or digital communication link 70, which logic is the control parameters inputted into the controller. This same link outputs data or operating parameters from controller B. These control and operating parameters are processed in accordance with a software operating system 100 that may have any platform configuration with JAVA virtual machine 102. In Hsu U.S. Pat. No. 6,002,104 the virtual machine is loaded with one or more JAVA application programs for performing the waveform editing as hereinafter described. Hardware 104 interacts with display 110 and is controlled by manual data entry device 112 in the form of a keyboard or mouse. As so far described, the total product of welder A and controller B, with real time control and monitoring of the welder by JAVA technology, is disclosed in Hsu U.S. Pat. No. 6,002,104. Waveforms exhibited on interactive display 110 are modified by manual data entry device 112 to create a new waveform to generate the desired control parameters on link 70 for real time control of the welding process between electrode E and workpiece W. The control parameters control the welding process in accordance with the final waveform; however, visual display 110 plots the real time operating parameters of the welding process. Thus, controller B monitors the ongoing welding process dictated by waveform ultimated selected by the control application program loaded in virtual machine 102. In practice, display 110 and manual data entry device 112 are adjacent welder A; however, link 70 can be a remote communication line.

Figure 3:
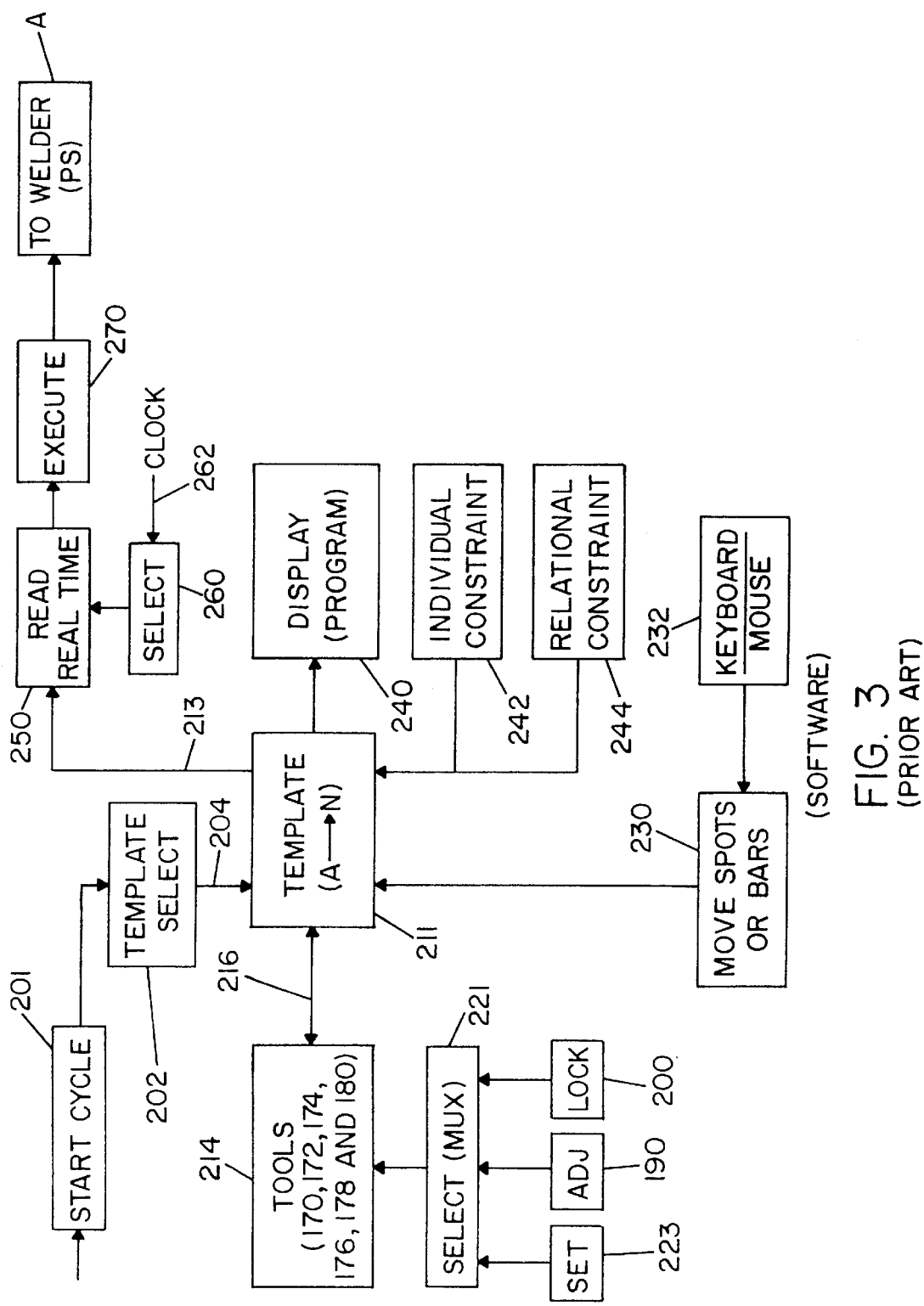
FIG. 3 is a functional block diagram of the control application program implemented by JAVA language and dedicated to a particular welder which program is used to program the architecture shown in FIG. 1 of the prior art electric arc welder.

JAVA virtual machine 102 is provided with a generic program. Data input indicated by block 111 has data that relates to welder A and is converted to JAVA source code, as indicated by block 113 which is predesigned. JAVA source code from block 113 is sent to compiler 114 to produce data in block 116 as bytecodes. Blocks 111, 113, 114, and 116 can be a CD ROM separate from welder A as shown by line 118. The CD ROM for the particular welder A is preferred; however, a tape or telephone line could be used to load application programs into virtual machine 102. The control program shown in FIG. 3 is also in JAVA language whereby the JAVA source code of the control program and the data specific to welder A are compiled and converted into bytecodes as indicated at block 116. This programming procedure is well known in the art and can be accomplished by persons in the welding industry to create a stand alone welder and controller having a JAVA virtual machine for implementing the unique control program. Compiler 114 compiles the source codes of block 113 into bytecodes at block 116 for use by virtual machine 102. The CD ROM 120 by the program of block 116 for the particular welder A is preferred; however, a tape or internet 112 could be used to load application programs into virtual machine 102. Welder A and controller B are commercial products, sold in the welding industry as a stand alone units which are programmed by an appropriate device, in practice a CD ROM containing bytecodes for application programs in JAVA language, such as an operating program illustrated in FIG. 3.

Figure 2:
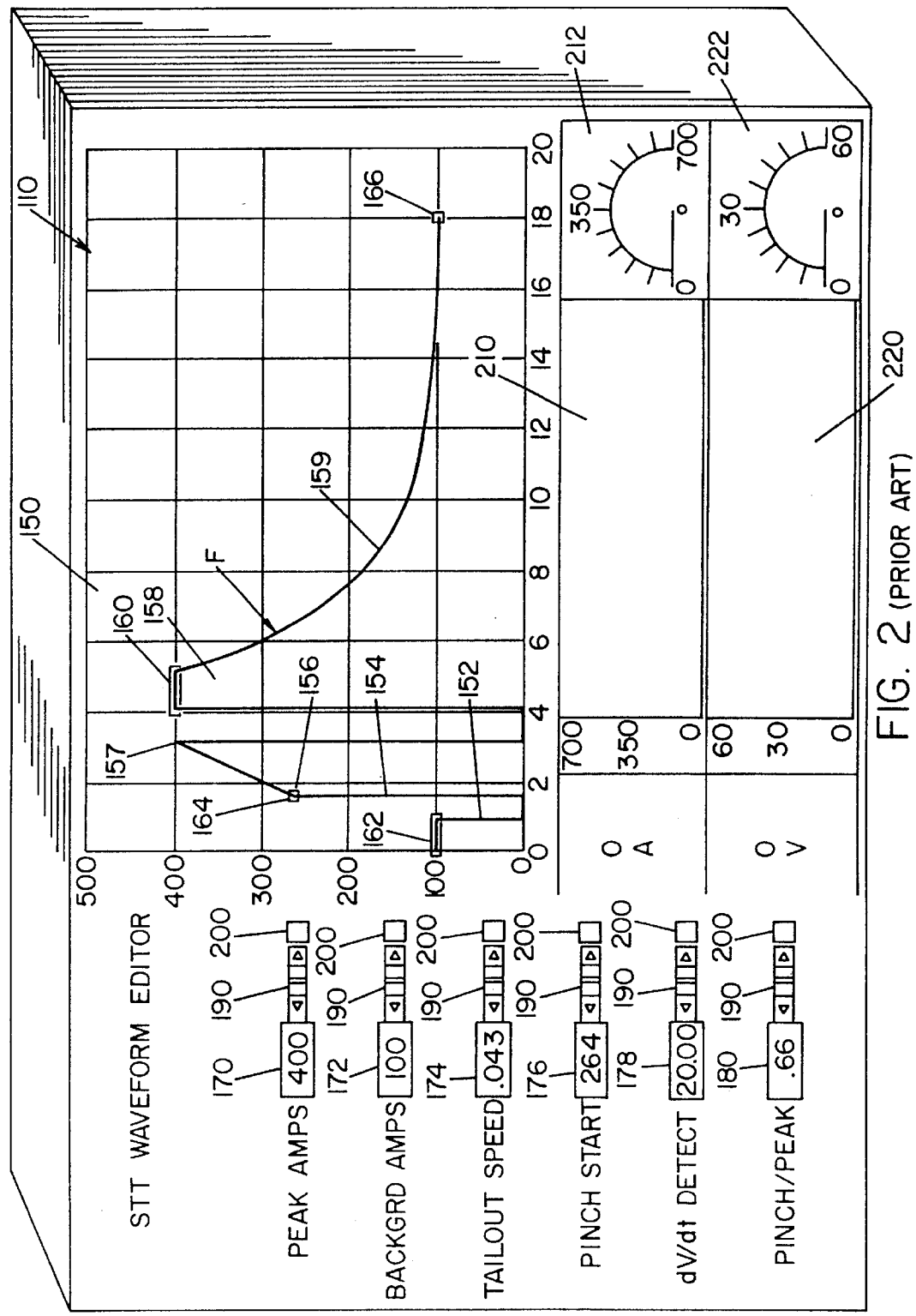
FIG. 2 is a front view of the CRT screen or graphic user interface showing the waveform and other visual devices when the controller is used to implement the script language program, which front view does not differ from the prior art shown in Hsu U.S. Pat. No. 6,002,104.

Operation of controller B to implement the control application program is illustrated in FIGS. 2 and 3. FIG. 2 shows interactive display 110 used for editing a waveform F to be used to generate the control parameters used for operation of the power supply of welder A to duplicate waveform F. Visually displayed on waveform screen 150 of interactive display 110 is waveform F. This waveform is processed by welder A. The illustrated waveform is a short circuit welding operation similar to the STT welding process where a short between the molten metal ball on electrode E and workpiece W is detected by a drop in voltage at 152. Then, the current is allowed to flow through the shorted metal, as indicated by line 154. An electrical pinch start at point 156, which is shown as 264 amperes. At point 157 a dv/dt detect indicates an imminent rupture of the fuse (short). The current is then turned off for a short period of time and is then allowed to have a plasma boost 158 with a tail along curve 159 awaiting the next short of the molten ball created by the arc of plasma after the fuse. Waveform F is representative in nature and is used by controller B to operate pulse width modulator 22 to follow waveform F during the welding process. Other waveforms on screen 150 can be implemented by welder A in the same manner. Persons skilled in arc welding would know how the variables are to be set.

Waveform F has a prebuilt or initial configuration when it is initially displayed on screen 150 of interactive display 110. The displayed waveform has certain portions which can be interactively moved. In this particular waveform, the peak current of the plasma boost is represented by a vertically movable bar 160. Background current of waveform W also has a vertically movable bar 162. Manual data entry device 112 allows an operator to select either of these bars by a mouse or keyboard and move the bars up or down. This action changes waveform F from the original prebuilt template by changing the current levels of the peak current 160 or the background current 162. In this particular example, waveform W also has two movable points 164 and 166 which can be moved vertically and horizontally, respectively. By interactively moving point 164, the current starting point for the pinch current is changed. In a like manner, moving point 166 left or right changes the tail out 159 of waveform F. Manipulation by a mouse to change either the level of bars 160, 162 or points 164, 166 modifies waveform F before the waveform is implemented in real time by controller B at welder A. Another waveform used for a different welding process would have different spots to be moved or bars to be raised or lowered. A prebuilt template is initially displayed on screen 150. Then the waveform is modified by moving the bars and changing the points to produce a similar waveform with different control parameters modified to create the desired waveform for use in the real time operation at welder A. The patented welder of Hsu U.S. Pat. No. 6,002,104 and the present invention both display a waveform to be used by controller B to direct operation of welder A. The waveform is visually edited or modified by merely interactively moving points and bars on the waveform to change the control parameter directed to bus 70 for control of welder A.

Interactive display 110 is provided with a number of read out devices or tools to also change control parameters of the displayed waveform F. The read out devices contain values given in alpha numerical numbers illustrated as peak amperes in read out device or window 170, background amperes in device or window 172, tail out speed in device or window 174, pinch start in device or window 176, dv/dt detect in device or window 178 and a relationship between the pinch current at point 164 and peak current bar 160 in device 180. Read out values in devices or windows 170, 172, 174, 176, 178 and 180 are the values for the displayed waveform F. As points 164, 166 are moved, the read out values change accordingly. The same is true of raising and lowering bars 160, 162. The tools or read out values in devices or windows 170, 172, 174, 176, 178 and 180 can be incrementally changed by associated scroll bars 190. If it is desired to lock a control parameter at a particular exhibited value in one of the devices or windows 170, 172, 174, 176, 178 and 180, the mouse activates a lock window 200 associated with the particular read out devices or tool. For instance, if the peak current is adjusted by scroll bar 190 to 400 amperes as is the maximum current desired for the waveform W, block 200 at window 170 is addressed by the mouse to lock the current at 400 amperes. The same operation is possible at the various tools. When a value displayed in a read out device or window 170, 172, 174, 176, 178 and 180 is a locked parameter, interactive manipulation of the points and bars on screen 150 cannot violate the constraints of the set value in the read out device. Interactive display 110 includes a graph 210 for a current plot together with an analog read out gauge 212. In a like manner, graph 220 plots the voltage level at the welding arc in a manner complying with analog read out gauge 222. As so far described, the present invention allows the implementation by welder B of waveform F. This waveform can be modified by a mouse or keyboard, subject to certain constraints at read out values 170, 172, 174, 176, 178 and 180, whereby the newly created or selectively modified waveform is implemented in a real time fashion by welder A.

The control application program in JAVA language used in Hsu U.S. Pat. No. 6,002,104 and in the present invention is illustrated in functional blocks in FIG. 3 where the start cycle block 201 allows an operator or welding engineer to select a desired prebuilt template A, as indicated by blocks 202. In the present invention the script files are used to change the selected templates. In the prior art the templates are fixed. Template A is loaded by line 204 into template manipulation block 211. Control parameters are directed from template manipulation block 211 through line 213 for control of the welding process at welder A in accordance with the actual template displayed on screen 150, as shown in FIG. 2. This is the control function of controller B, where welder A has a welding process determined by the ultimate waveform in block 211. When this monitor function is being implemented, the final controlling waveform is in a background window not visible on screen 150 of display 110. Read out value in devices or windows 170, 172, 174, 176, 178 and 180 are functionally manipulated as indicated by block 214 to changes the displayed read out values according to displayed waveform F. Block 214 is used to modify waveform F as previously described. Functional manipulation of waveform F by block 214 is input data on input/output line 216. Read out devices or windows 170, 172, 174, 176, 178 and 180 are multiplexed by multiplexer 221 so that the set value can be changed by entering an alpha numerical number as indicated by block 223. The scroll bar and control parameter locking device are operated by addressing the windows 190, 200, as previously described. Function block 230 indicates that spots or bars forming portions of waveform F can be moved by the data entry device 112, using functional program 232. Waveform F is reconstructed into the desired final configuration by action of manipulation subroutine of block 211 using information, or data, on line 216 and the interactive adjustment from functional subroutine 230. Values for windows 170, 172, 174, 176, 178 and 180 are outputted from block 211 on line 216.

Block 240 is the program for displaying the present waveform F, which has been edited or modified from an original waveform A to a new waveform N by the subroutine of block 211. Controller B executes the data or control parameters comprising the new waveform F. As indicated by functional block 242, a subroutine is provided wherein values of block 214 and movement of spots and bars by function subroutine of block 230 cannot change certain parameters of the waveform. For instance, background current 162 could not be greater than pinch start current 164. Such constraints are applied to functional block 211 for constricting manual manipulation as changes by read out devices 170, 172, 174, 176, 178 and 180 of waveform F. As indicated in the subroutine or functional subroutine 244, there are certain relational constraints which are also applied to certain control parameters. For instance, if the ratio in read out device or window 180 is locked at a set point, adjustment of the pinch current 156 will correspondingly adjust the peak current 160. The constraint subroutines indicated by functional blocks 242 and 244 are merely added program features used in the manual implementation of waveform F to a desired waveform for execution by welder A. As previously indicated, control parameters are directed to the welder A by line 213. Control parameters are read in real time, as indicated by functional block 250. The particular parameter being read and outputted, or executed, at any given time is selected in a sequence as indicated by functional block 260 at a rate determined by the rate of pulses on line 262. Executive program of block 270 executes the control parameters to duplicate waveform F as the welding process through controlling pulse width modulator 22 in accordance with standard switching technology.

Figure 4:
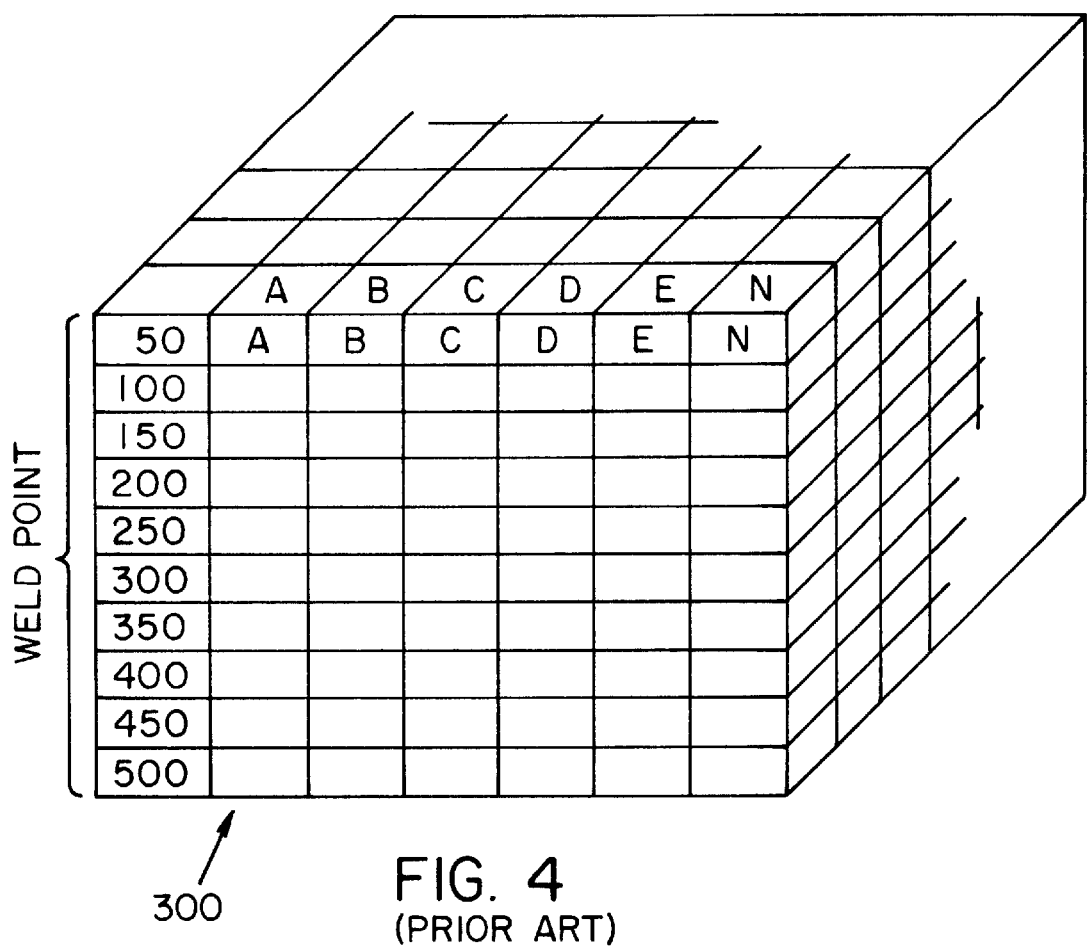
FIG. 4 is a schematic representation of a weld point stack which is processed by using the present invention and includes parameters and waveform logic to control the welder.
Figure 5:
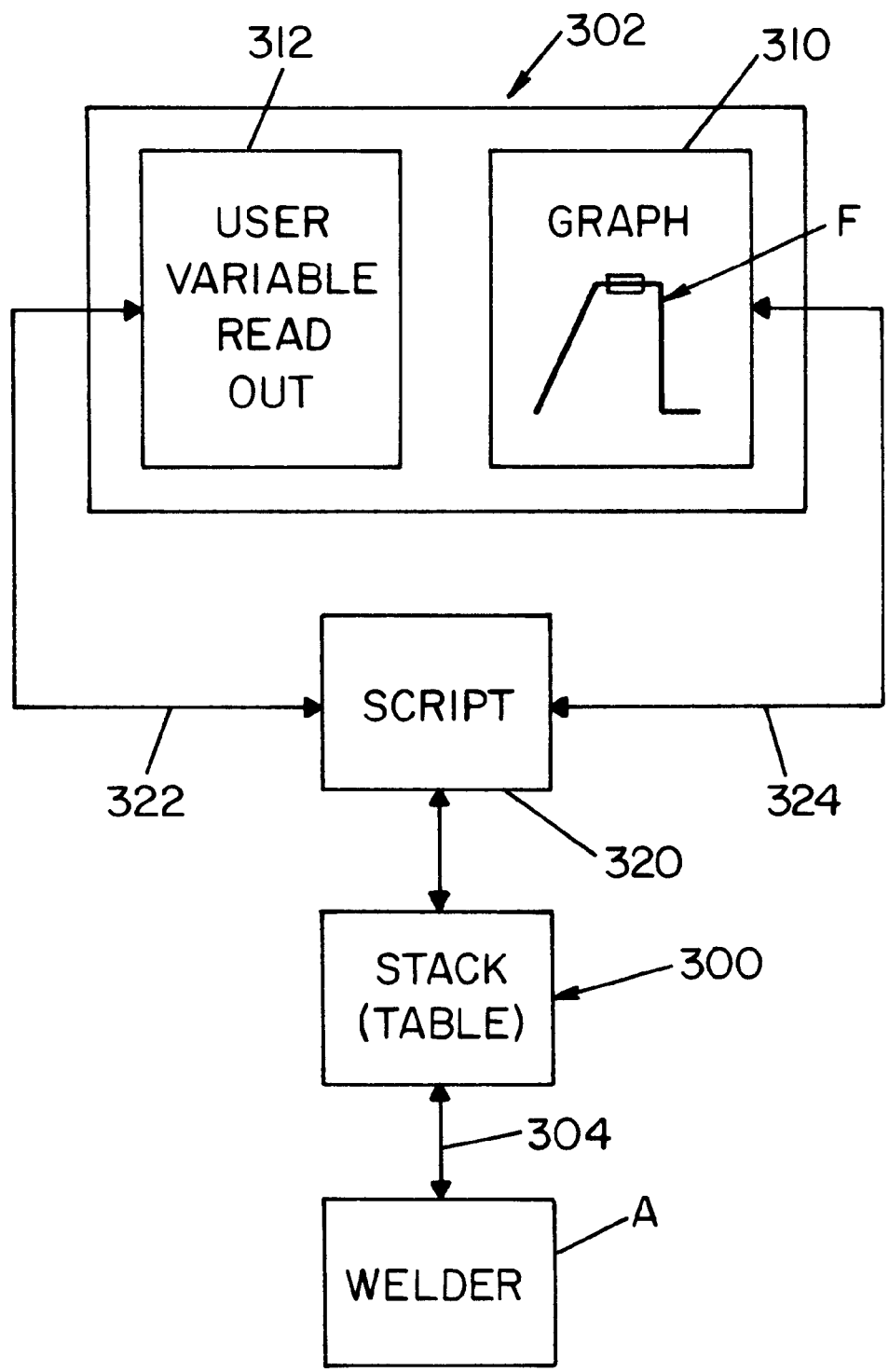
FIG. 5 is a schematic block diagram showing the broad aspect of the present invention for processing data from the stack shown in FIG. 4 to the graphic user interface and vice versa.

Referring now to FIGS. 4 and 5, the data stack 300 includes the value of various parameters and is a part of the computer program and includes variable tables of parameters and the waveform logic to operator welder by the signal on line 56 to control pulse width modulator 22. This device converts DC bus to an output of the power supply tracing a desired waveform and dynamic behavior. The power supply can be an inverter or chopper, both of which are powered by input DC bus. The stack data is processed by script language program 320, to control the graphic user interface (GUI) 302. Stack 300 also includes the parameter tables and waveform logic to control the welder with the waveform created on GUI 302. The script program determines where the data is located to be selected from the stack, where it is to be put or located in the graphic user interface 302 displayed on CRT 150 shown in FIG. 2. Waveform F is constructed by the script program 320 through a program line 324. In a like manner, the read out user variables 312 of GUI 302 are controlled by the script program indicated by line 322. These two GUI components are specified in script language. The script program determines the behavior of the user variable read out in section 312 of GUI 302 as well as the graphic display section 310. As previously described, the displayed waveform F, which is modified by interaction with the GUI 302 by a keyboard or mouse 112. The modified waveform accomplished by the GUI is the waveform ultimately processed by electric arc welder A. The GUI program 302 is a computer program that is designed from script 320 and communicates data to and from stack 300. After the script file or program 320 processes a first parameter A, it then processes each of the other parameters to load the parameters in the read out section 312 and then placed them into stack 300. The user then constructs the graphically illustrated waveform F in section 310. In practice, the program in script language file 320 individually processes in an interactive fashion the read out parameters in succession and then constructs each portion of the graph defining waveform F. The script language program defines the waveform as a line having work points set forth in FIG. 4 and operated by the waveform logic in stack 300. Consequently, the script program represented as script 320 controls the program being processed by the JAVA virtual machine in accordance with the values of parameters and logic in stack 300. The data from the script program has variables to be modified which is a subset of the parameter in stack 300. The other parameters are fixed and not interactively manipulated by the user. The GUI program is used to react to user changes. When a user makes changes in sections 310, 312, these changes are retained in stack 300.

In accordance with the invention, script program 320 is loaded from a script file. There is a script file or files for each welding process, but many programs for the process can share a script file. There is the ability to select the particular program to be used for a known weld process. FIG. 5 illustrates the use of script language 320 from a script file for controlling the display of the graphic user interface as shown in FIG. 2. This presents read out in section 312 and the waveform in section 310 for processing in accordance with the base program shown in Hsu U.S. Pat. No. 6,002,104. The present invention uses script language in the GUI program 302 to modify the waveform and provide changes in the waveform and read out without changing the main operating program controlling the welder. The basic control of the welder is by data and logic in stack 300. In Hsu U.S. Pat. No. 6,002,104, the weld program of data and logic in stack 300 is directly communicated with the computer of user interface 302. The present invention utilizes script program 320 as a navigator or map to define the relationship of a weld program (data and logic) in stack 300 as it is placed into sections 310, 312. The script program 320 controls the variable tables for interface 302. But, stack 300 also controls and read the welder operation as indicated by line 304. The controller of the welder provides data to give dynamic reaction or behavior caused by the actual arc conditions in the weld process. The script filed used a script 320 determines the ability to change the data on interface 302 and, thus, the subject data and logic of stack 300 causing the power supply to trace waveform F. By using an intermediate script program 320, the template for the waveform can be changed and there is rapid interaction between the operator and the read out stage 312 for modifying waveform F of section 310. By using the script, the template select program step of the prior art as shown in FIG. 3 is converted. The template select step 202 is the same. However, the template itself is in script language and is flexible as opposed to being fixed as in the prior art.

Figure 6:
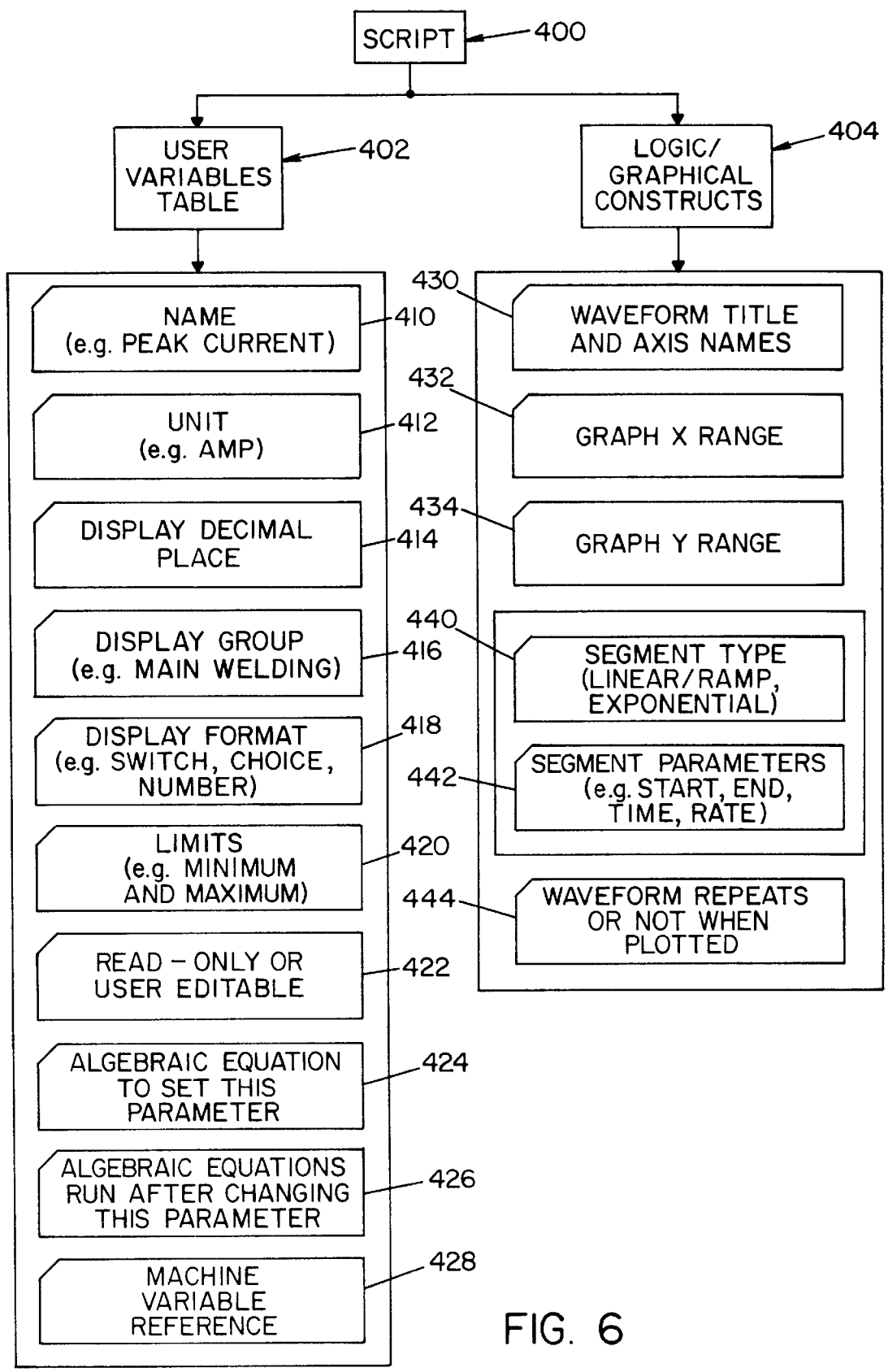
FIG. 6 is a block diagram showing the components in script language in accordance with the preferred embodiment of the present invention.
Figure 7:
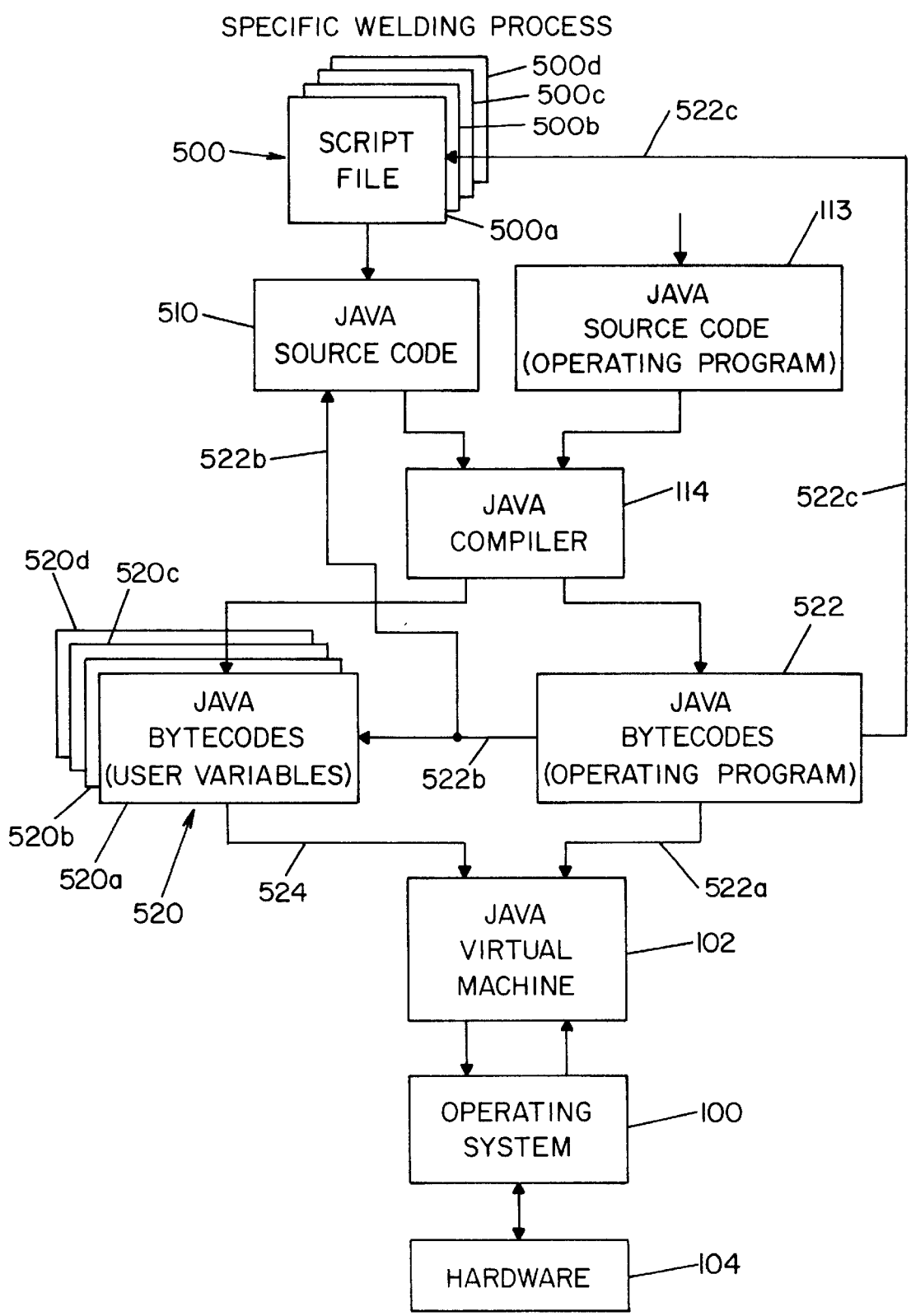
FIG. 7 is a block diagram showing the first implementation of the present invention utilizing scripting language files compiled into JAVA source code as an intermediate step, then compiled into bytecodes.

A variety of script language files can be used in practicing the present invention for transfer to stack 300 and then manipulated by the user. In practice, the preferred program is set forth in FIG. 6 wherein the script program has two sections 402 for the user variable table and section 404 for the logic graphic constructs to be added. The section of the script language program set forth as section 402 includes program steps which are repeated for each of the multiple variables used in constructing the waveform F and for manipulating the parameters the purposes of modifying the shape of the waveform. Steps 410, 412, 414, 416, and 418 are program steps to define a particular parameter. Step 420 provides the constraints on the parameter, as previously described in Hsu U.S. Pat. No. 6,002,104. The operation to be performed on the parameter is set forth in step 422. The algebraic manipulations are performed at, steps 424 and 426. These program steps set the parameters and change the parameters in accordance with demands of the operator. The fixed machine variable reference for each of the parameters is provided at step 428. All of these steps are performed for each of the parameters addressed by script program 320, as shown in FIG. 5. The script program also includes section 404 for controlling the waveform. In this portion of the program defined in script language steps 430, 432 and 434 are not repeated for each of the script programs. Steps 440 and 442 define the shape of the waveform as it is constructed segment by segment. Step 444 instructs the GUI computer to repeat the waveform or not when plotted. This script language program as set forth in FIG. 6 is used in the preferred embodiment of the present invention as a subset to the data and logic of the welder program stored in stack 300 in FIG. 4. The script program of FIG. 6 communicates the various parameters in stack 300 with the operating program contained in the script language. The script language controls the construction of the waveform F and the constraints of the read out on the left side of FIG. 2. However the operating program at the welder itself is processed as set forth in Hsu U.S. Pat. No. 6,002,104. The invention is the use of script language for controlling the variables on the waveform construction on interface 302 for processing by welder A in accordance with the invention of Hsu U.S. Pat. No. 6,002,104. The script program as disclosed in FIG. 6 can be varied and is provided in the form of script program files or library 500 as shown in FIG. 7. The programs are used in connection with the data and logic in stack 300. In the preferred embodiment, both the sections 402 and 404 have been used; however, in accordance with the invention, either of the sections could and have been used separately.

Figure 11:
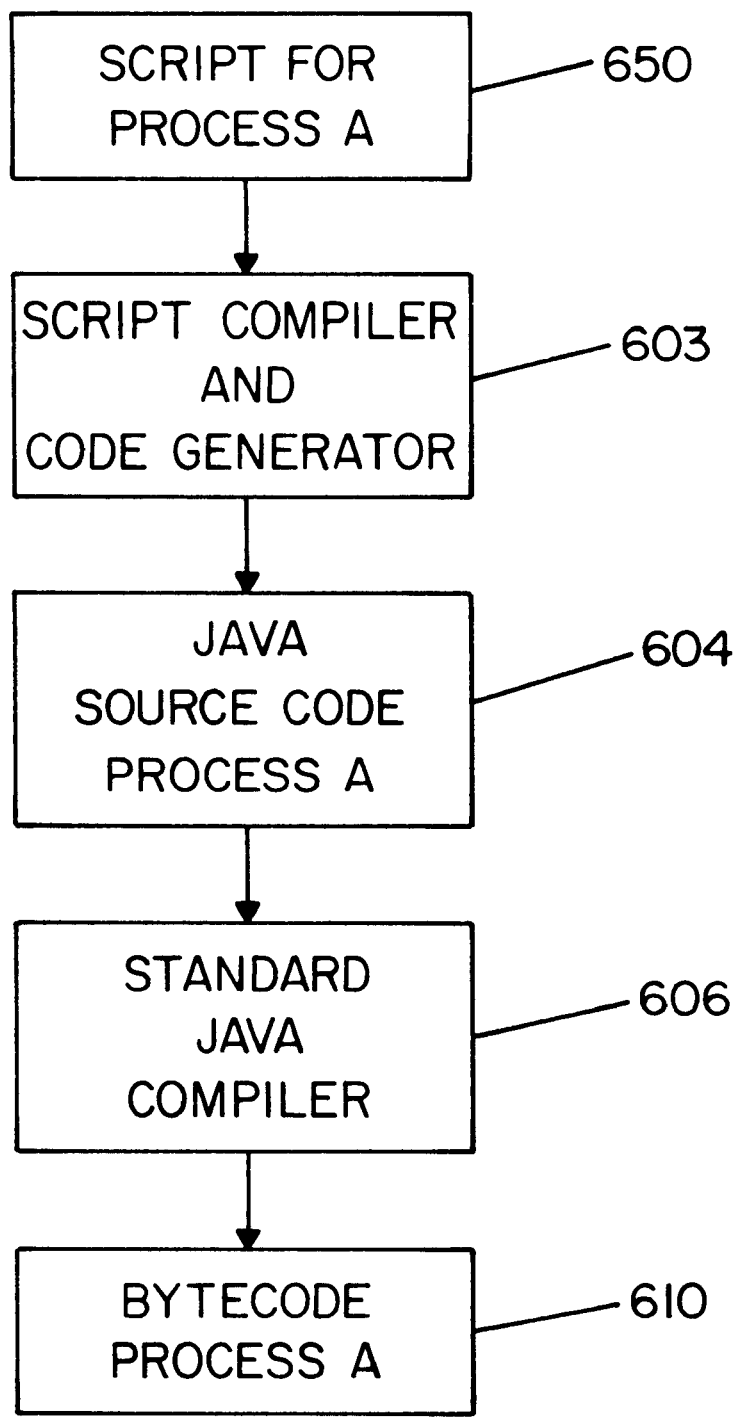
FIG. 11 is a flow chart for generating GUI components for a specific weld process; and, FIG. 12 is a schematic layout of a summary of architecture used in the preferred embodiment.

The present invention can be implemented by using the script files at the input of compiler 114 or the script files or library 500 can be introduced into the platform comprising JAVA virtual machine 102. The first implementation of the invention is illustrated in FIG. 7 wherein the block diagram shows the script language library or files 500 including several distinct programs or script files 500a–500d, each of which relates to a different weld process, mode of operation or program for the interactive controlling the operation of the welder. A selected one of the script files in library 500 is compiled into a waveform JAVA source file as an intermediate step in block 510 under control of the bytecode operating program at block 522. This JAVA source code file compiled from a selected script file program and the operating program in JAVA source code at block 113 is compiled by JAVA compiler 114 to produce a user variable program in class bytecodes or object codes as indicated by file 520. The files 500a–500d create user variable files 520a–520d. The individual files of library 500 are schematically represented as the program 400 in FIG. 6. The operating program in object code, or JAVA bytecodes is directed from block 113 through compiler 114 to block 522. The user variable script language controlled programs in library 520 are loaded, as indicated by line 524, by the operating program in JAVA bytecode from block 522, as indicated by line 522a, into JAVA virtual machine 102. Thereafter, the GUI program on the top of JAVA virtual machine 102 with operating system 100 and hardware 104 processes the object codes or bytecodes for both the interactive language generated by programs in library 520 and the operating program in JAVA bytecode from block 522. The operating program in JAVA bytecodes as indicated by block 522 controls the user variable the JAVA source code compilation in 510 as indicated by line 522b and the selection and processing of the script program from library 500 as indicated by line 522c. Line 522b also coordinates all of the script language processing in accordance with the operating program in JAVA bytecodes, as shown in library 522. The program or file for a given process is selected from library 500 and is compiled into JAVA source code as indicated by block 510. This is shown in the flow chart of FIG. 11.

Figure 8:
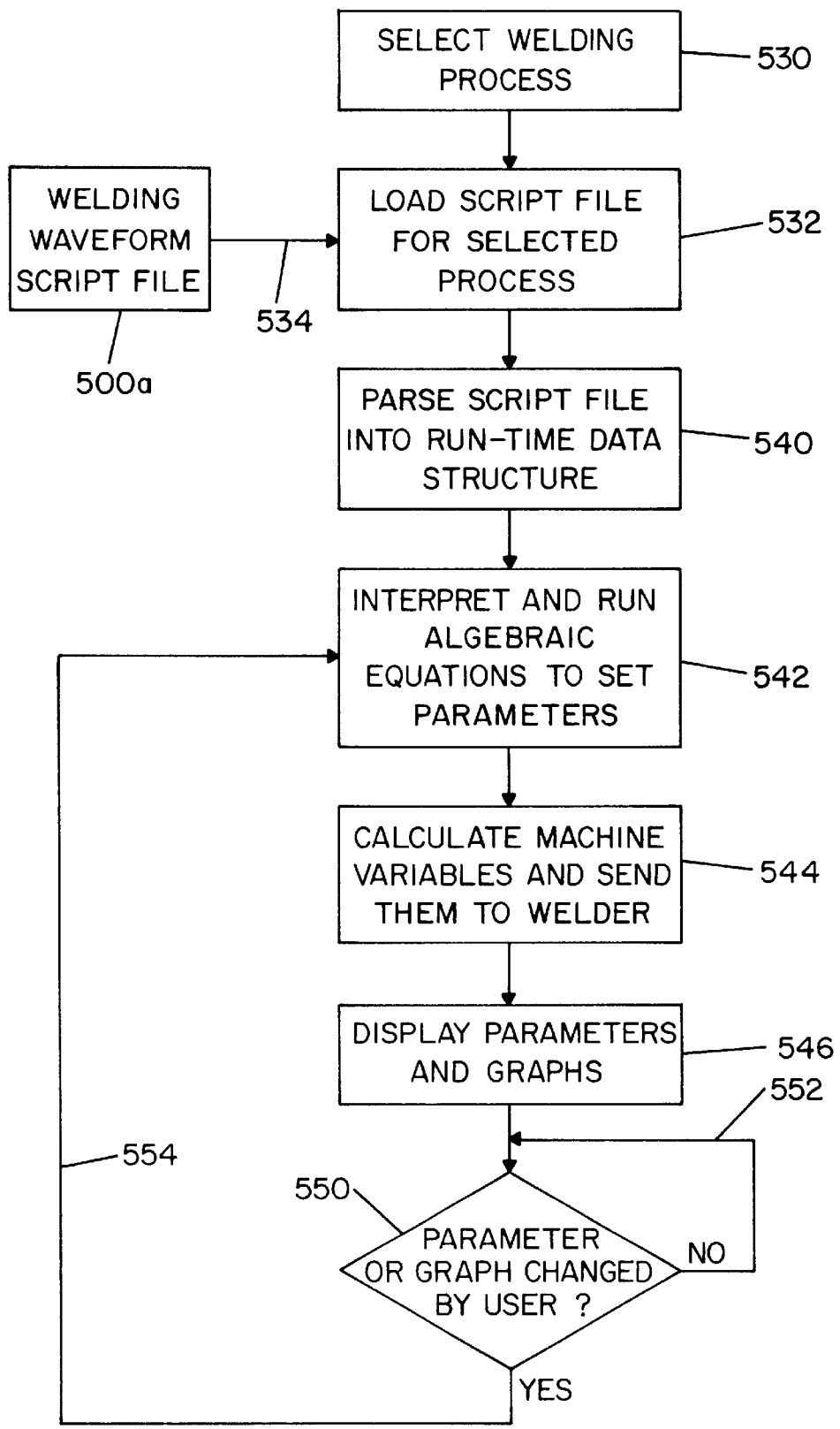
FIG. 8 is a block diagram showing a second embodiment of the invention wherein the script files are directly communicated with the operating program (block 116) of FIG. 1 for merely interpreting the script language by the computer operating system including the JAVA platform.

This first implementation of a script language or program disclosed in FIG. 6 is the introduction of the selected script file from library 500 into compiler 114 shown in FIG. 1. The second implementation of the invention is the introduction of the selected file from library 500 directly into the operating program which, in practice, is a JAVA applet or application on top of JAVA virtual machine 102. This implementation is shown in FIG. 8 and involves an interpreter for the script program as opposed to a single or dual compiled program as shown in FIG. 7. Using the interpreter concept, the welding process to be performed by welder A is selected as indicated by block 530. This causes a selected file indicated to be file 500a from library 500 to be loaded into the program area 532, as represented by link or line 534. The script program is parsed into data structure including algebraic equations indicated by block 540. These equations are interpreted and run in a manner to set the parameters of the waveform as indicated by block 542. The machine variables are then calculated and sent to the welder by a communication link as indicated by block 544. These parameters and the waveform are displayed on the CRT as indicated by block 546. If the parameters or graphs are not changed by the user, decision block 550 has a negative response as indicated by line 552. The GUI program does not change the stack and merely recycles or waits. If decision block 550 indicates that there has been a change, the signal in line 554 activates block 542 again to interpret the equations after the changes by the operator, as indicated by line 554. This then recirculates the program through steps 542, 544, 546, and 550. The operating program in JAVA bytecode as indicated in block 116 of FIG. 9 controls the processing as indicated by the flow chart shown in FIG. 8.

Figure 9:
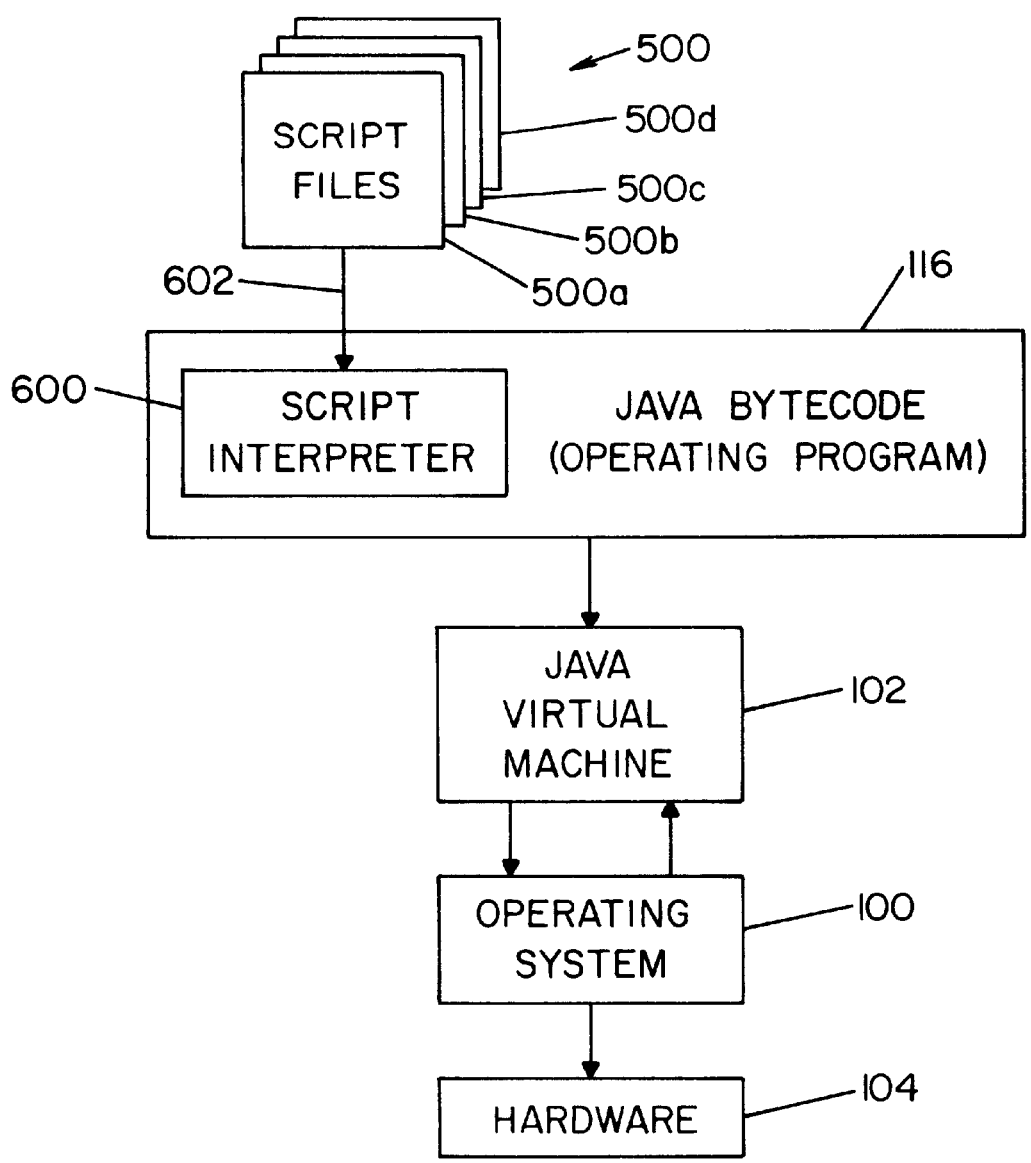
FIG. 9 is a block diagram illustrating the preferred embodiment of the present invention utilizing concepts of the processing method shown in FIGS. 7 and 8.

FIG. 7 illustrates an implementation of the invention wherein the selected script file is compiled parallel with the operating program. FIG. 8 is an implementation of the invention wherein the selected script file or program is directly interpreted by the GUI operating program. The block diagram of FIG. 9 shows the computing process that implements the logic in FIG. 8. In FIG. 9, the operating, program is compiled in JAVA language and processed as JAVA bytecodes in block 116 as shown in FIG. 1. The selected script file is interpreted at block 116 by interpreter 600 loaded with the script program through line 602. This is an implementation of the present invention now being used in practice.

FIG. 4 shows stack 300 in the welder computer control having parameter tables and waveform logic to operate the welder. The script programs process the variables to be manipulated on the graphic user interface (GUI) to provide versatility to the patent system in Hsu U.S. Pat. No. 6,002, 104. Stack 300 is inside the welder and the GUI operating program directs script data and logic to the stack for processing by the welder and provides interactive communication between the stack of the welder and the CRT of FIG. 2.

Figure 10:
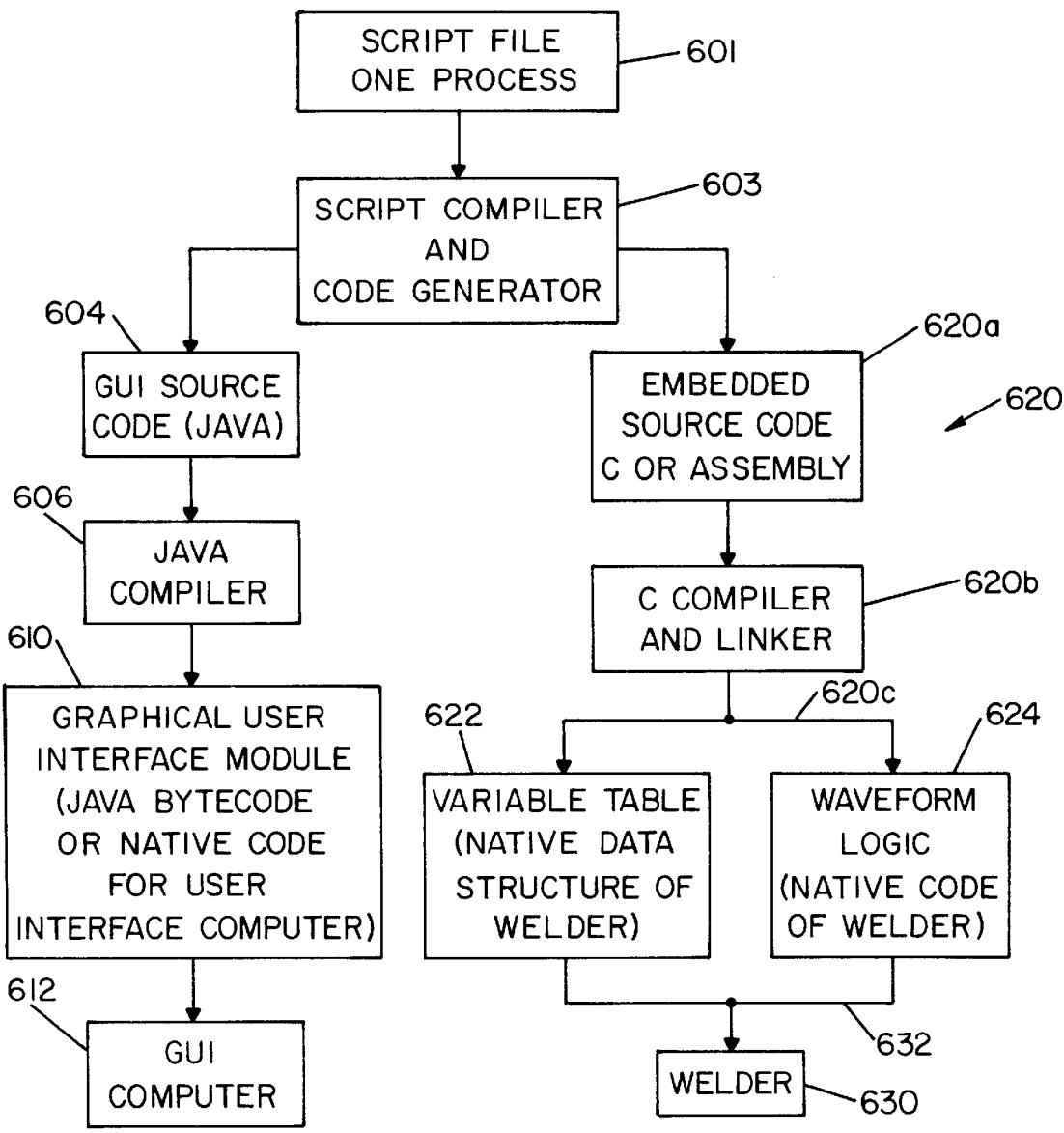
FIG. 10 is a block diagram of an extension of the preferred embodiment of the invention.

In another implementation of the invention, the script program 601 as shown in FIG. 10 is compiled by a script compiler and code generator 603 into two distinct programs. The script program as disclosed in FIG. 6 is used for the graphic user interfaces as so far described. This is shown as the graphic user interface program 610 compiled into JAVA bytecode for GUI computer 612 including JAVA virtual machine 102 shown in FIG. 1. Compiler 603 creates GUI source codes in JAVA language as indicated by block 604. The JAVA source code is then compiled by compiler 606 into JAVA bytecode or native code for the user interface computer as program 610. Script 601 has a second program 620 supplemental to program 610. This program involves an embedded source code in C or Assembly shown as block 620a that is compiled and linked by compiler and linker 620b communicated by link 620c to compile native codes in sections 622 and 624. Section 622 is the compiled variable tables in a language native to the welder 630 by link 632. In a like manner, section 624 is the compiled waveform logic in a language native to the microprocessor of the welder. In this script program system, the script program is used to construct the welder contained stack 300 shown in FIG. 4. The prior implementation used the script program as a GUI look-up reference map to the pre-built data and logic for the table inside the welder. Now, the script program itself is used as the source code instructions to construct stack 300 in its entirety. Then program 610 performs the operation of processing data from the stack constructed by sections 622, 624 and the interaction with the graphic user interface to customize the waveform processed by welder A. In summary, compiler 603 generates source code in C or Assembly that is compiled into native codes that are linked and loaded into welder 630. Compiler 603 also compiles a selected file 601 from a file library of script programs into JAVA source code that is an intermediate step. The source code is compiled by compiler 606 into bytecodes or native language to operate GUI computer 612 that includes virtual machine 102. The intermediate step of FIG. 10 is shown in the flow chart for generating GUI components of a given process A. In the flow chart of FIG. 11, the script language file 650 is compiled by compiler 603 into JAVA source code at block 604. A standard JAVA compiler 606 then compiles the JAVA source code into bytecode for use by the GUI computer as shown by block 610. The intermediate step is a block 604 to convert the script language to usable JAVA source code.

Figure 12:
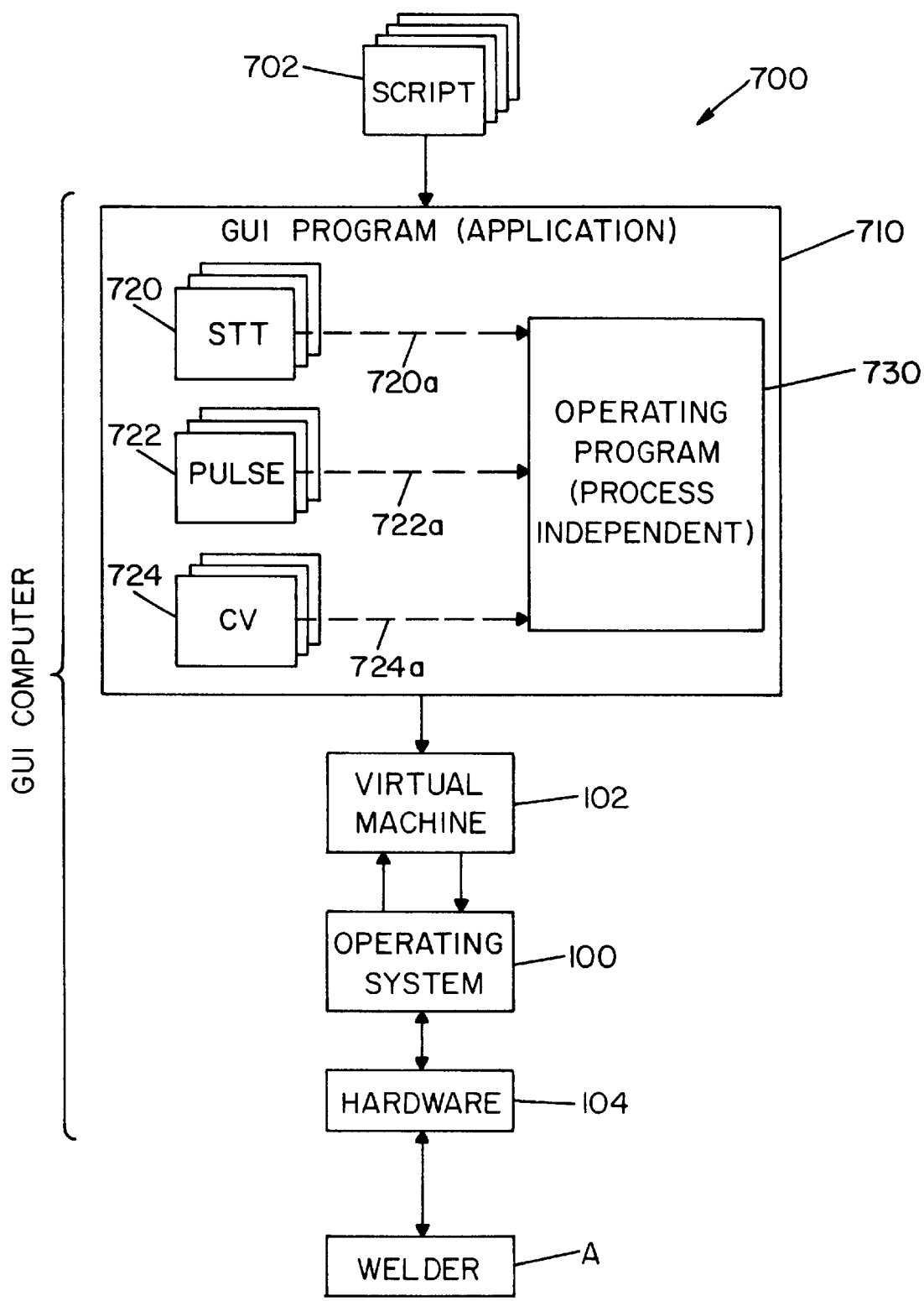

A summary of the invention is shown by the architecture 700 in FIG. 12. A file from script library 702 is communicated to the GUI computer (application 710, virtual machine 102, operating system 100, and hardware 104) after being compiled as disclosed in FIGS. 10 and 11. In the prior art, the application or GUI program was fixed. The application was on top of the JAVA virtual machine 102, operating system 100 and hardware 104 comprising the prior art GUI computer. In the invention, the application or program 710 is not fixed. GUI components for each of many welding processes are shown as STT scripts 720, pulse weld scripts 722 and constant voltage programs 724. One of these script language programs is loaded as indicated by lines 720a, 722a, and 724a into the process independent operating program 730 to allow change of the script program by the GUI. Then the customized application 710 operates the welder A through virtual machine 102.

The invention has been disclosed with several implementations. However, such disclosed implementations are not to limit the basic concept of using a script program for editing the waveform to be processed by welder A.

Having thus defined the invention, the following is claimed:

1. An electric arc welder for creating a welding cycle with a real time current waveform constituting several control parameters by a pulse width modulator that controls a switching power supply under control of a signal so the output of the power supply traces a desired waveform and dynamic reaction behavior to arc conditions defined by said control parameters, said welder having a microprocessor controller and an operating program, for creating said signal and reading said parameters, a graphic user interface computer, a system with a first interface for an interactive display for displaying said desired waveform and dynamic behavior and at least one manipulative control parameter, a second interface for a manual data entry device to change said desired waveform and/or said parameters and a communication link for causing said welder to perform said desired waveform by controlling said signal, a number of script language files, which are text files containing specifications of welding waveforms for defining a given type of waveform and dynamic behavior and containing a user manipulative variable table of control parameters and a graphical construction program to display a waveform to be implemented by said welder, and an input stage for processing a selected one of said script files into graphic interface components for operating said welder, wherein the selected script file is used to modify the desired waveform while not altering the operating program which controls the welder.

2. An electric arc welder as defined in claim 1 wherein said graphic user interface computer contains a JAVA virtual machine.

3. An electric arc welder as defined in claim 2 wherein said input stage is a compiler for converting said selected script file to a JAVA bytecode file.

4. An electric arc welder as defined in claim 3 wherein said selected script file is converted into JAVA source code.

5. An electric arc welder as defined in claim 2 wherein said input stage is a script interpreter.

6. An electric arc welder as defined in claim 5 wherein said selected script file is converted into JAVA source code.

7. An electric arc welder as defined in claim 2 wherein said input stage includes a first compiler to convert said script file into a JAVA source file and a second compiler to compile said JAVA source file into a JAVA bytecode file.

8. An electric arc welder as defined in claim 7 wherein said selected script file is converted into JAVA source code.

9. An electric arc welder as defined in claim 2 wherein said input stage is a first section configured as an interpreter to direct a selected script file directed to said graphic user interface program.

10. An electric arc welder as defined in claim 9 wherein said selected script file is converted into JAVA source code first as an intermediate product.

11. An electric arc welder as defined in claim 2 wherein said selected script file is converted into JAVA source code.

12. An electric arc welder as defined in claim 1 wherein said input stage is a compiler for converting said selected script file to a code native to the graphic user interface computer.

13. An electric arc welder as defined in claim 1 wherein said input stage is a script interpreter.

14. An electric arc welder as defined in claim 1 wherein said input stage includes a first compiler to convert said script file into a JAVA source file and a second compiler to compile said JAVA source file into a JAVA bytecode file.

15. An electric arc welder as defined in claim 1 wherein said input stage is a first section configured as an interpreter to direct a selected script file directed to said graphic interface computer and a second section for directing an operating program to said graphic interface computer.

16. An electric arc welder as defined in claim 15 wherein said second section includes a compiler to convert said operating program into native code for said graphic user interface program.

17. An electric arc welder as defined in claim 16 wherein said selected script file is converted into JAVA source code first as an intermediate product.

18. An electric arc welder as defined in claim 1, wherein said desired waveform is provided as a pre-built waveform template, and the desired waveform is configured to be edited to the waveform to be implemented by the welder.

19. An electric arc welder for creating a welding cycle with a real time current waveform constituting several control parameters by a pulse width modulator that controls a switching power supply under control of a signal so the output of the power supply traces a desired waveform defined by said control parameters, said welder having a microprocessor controller and an operating program, for creating said signal and reading said parameters, a graphic user interface computer controlled by input from a dedicated computer platform, a system with a first interface for an interactive display for displaying said desired waveform and at least one manipulative control parameter, a second interface for a manual data entry device to change said waveform and/or said parameters and a communication link for causing said welder to perform said desired waveform by controlling said signal, a number of script language files, which are text files containing specifications of welding waveforms for defining a given type of waveform and containing a user manipulative variable table of control parameters and/or an input stage for processing a selected one of said script files into graphic user interface components for operating said welder, wherein the selected script file is used to modify the desired waveform while not altering the operating program which controls the welder.

20. An electric arc welder as defined in claim 19 wherein said graphic interface computer contains a JAVA virtual machine.

21. An electric arc welder as defined in claim 20 wherein said input stage is a compiler to convert said selected file to a JAVA bytecode.

22. An electric arc welder as defined in claim 20 wherein said input stage is an interpreter.

23. An electric arc welder as defined in claim 19 wherein said input stage is a compiler to convert said selected file to a native code.

24. An electric arc welder as defined in claim 19 wherein said input stage is an interpreter.

25. An electric arc welder as defined in claim 19, wherein said desired waveform is provided as a pre-built waveform template, and the desired waveform is configured to be edited to the waveform to be performed by the welder.

26. An electric arc welder for creating a welding cycle with a real time current waveform constituting several control parameters by a pulse width modulator that controls a switching power supply under control of an signal so the output of the power supply traces a desired waveform defined by said control parameters, said welder having a microprocessor controller and an operating program, for creating said signal and reading said parameters, a graphic user interface controlled by input from a graphic interface computer, a system with a first interface for an interactive display for displaying said desired waveform and at least one manipulative control parameter, a second interface for a manual data entry device to change said waveform and/or said parameters and a communication link for causing said welder to perform said desired waveform by controlling said signal, a number of script language files, which are text files containing specifications of welding waveforms for defining a given type of waveform and containing a graphical construction program to display a waveform to be implemented by said welder, and an input stage for directing a selected one of said script files to said dedicated platform for operating said welder, wherein the selected script file is used to modify the desired waveform while not altering the operating program which controls the welder.

27. An electric arc welder as defined in claim 26 wherein said graphic interface computer platform is a JAVA virtual machine.

28. An electric arc welder as defined in claim 27 wherein said input stage is a compiler to convert said selected file to a native code.

29. An electric arc welder as defined in claim 27 wherein said input stage is a compiler to convert said selected file to a native code.

30. An electric arc welder as defined in claim 27 wherein said input stage is an interpreter.

31. An electric arc welder as defined in claim 26 wherein said input stage is an interpreter.

32. An electric arc welder as defined in claim 26, wherein said desired waveform is provided as a pre-built waveform template, and the desired waveform is configured to be edited to the waveform to be implemented by the welder.

33. A method of controlling an electric arc welder for creating a welding cycle with a real time current waveform constituting several control parameters by a pulse width modulator that controls a switching power supply under control of a signal so the output of the power supply traces a desired waveform defined by said control parameters, said welder having a microprocessor controller and an operating program, for creating said signal and reading said parameters, said method comprising:
  (a) providing an operating computer system controlled by input from a graphic interface computer,
  (b) providing a system with a first interface for an interactive display for displaying said desired waveform and at least one manipulative control parameter, a second interface for a manual data entry device to change said waveform and/or said parameters and an I/O connection for causing said welder to perform said desired waveform by controlling said signal,
  (c) providing a number of script language files, which are text files containing specifications of welding waveforms for defining a given type of waveform and containing a user manipulative variable table of control parameters and/or a graphical construction program to display a waveform to be implemented by said welder, and,
  (d) directing a selected one of said script files to said graphic interface computer for operating said welder, wherein the selected script file is used to modify the desired waveform while not altering the operating program which controls the welder.

34. A method as defined in claim 33 wherein said graphic interface computer contains a JAVA virtual machine.

35. A method as defined in claim 34 wherein said directing includes compiling said selected script file to a JAVA bytecode.

36. A method as defined in claim 35 further including:
  (e) converting said selected script file into JAVA source code.

37. A method as defined in claim 34 wherein said directing includes interpreting said selected script file.

38. A method as defined in claim 37 further including:
  (e) converting said selected script file into JAVA source code.

39. A method as defined in claim 34 further including:
  (e) converting said selected script file into JAVA source code.

40. A method as defined in claim 33 wherein said directing includes compiling said selected file to a code native to the platform.

41. A method as defined in claim 33 wherein said directing includes interpreting said selected script file.

42. A method as defined in claim 33, wherein said desired waveform is provided as a pre-built waveform template, and the desired waveform is configured to be edited to the waveform to be implemented by said welder.

43. A graphic user welder interface for directly controlling or monitoring a welding process, said welder interface being a Java graphic interface comprising at least one graphical widget defined by a scripting file loaded in run-time and a computer program for loading said scripting file into said welder interface, the scripting file configured as a text file containing specifications of a waveform used for the welding process.

44. A graphic interface as defined in claim 43 wherein said widget is selected from the class consisting of a slider, a text box, a switch, a choice, an interactive chart, a button, a panel or combinations thereof.

45. A graphic interface as defined in claim 43 wherein said scripting file incorporates the specifications of a welding process including at least one of arc behavior, heat input, metal transfer, arc stability or weld bead shape.

46. An electric arc welder for creating a welding cycle with a real time current waveform constituting several control parameters by a microprocessor and an operating program, that controls a power supply by a command signal so the output of the power supply traces a desired waveform and dynamic reaction behavior to arc conditions defined by said control parameters, said welder having a controller for creating said signal and reading said parameters, a graphic user interface computer, a system with a first interface for an interactive display for displaying said desired waveform and dynamic behavior and at least one manipulative control parameter, a second interface for a manual data entry device to change said waveform and/or said parameters and a communication link for causing said welder to perform said desired waveform by controlling said command signal, a number of script language files, which are text files containing specifications of welding waveforms for defining a given type of waveform and dynamic behavior and containing a user manipulative variable table of control parameters and/or a graphical construction program to display a waveform to be implemented by said welder, and an input stage for processing a selected one of said script files into graphic interface components for operating said welder, wherein the selected script file is used to modify the desired waveform while not altering the operating program which controls the welder.

47. An electric arc welder as defined in claim 46 wherein said graphic user interface computer contains a JAVA virtual machine.

48. An electric arc welder as defined in claim 46 wherein said input stage is a compiler for convert said selected script file to a code native to the graphic user interface computer.

49. An electric arc welder as defined in claim 46 wherein said input stage is a script interpreter.

50. An electric arc welder as defined in claim 46 wherein said input stage includes a first compiler to compile said script file into a JAVA source file and a second compiler to compile said JAVA source file into a JAVA bytecode file.

51. An electric arc welder as defined in claim 46 wherein said input stage is a first section configured as an interpreter to direct a selected script file directed to said graphic interface computer and a second section for directing an operating program to said graphic interface computer.

52. An electric arc welder as defined in claim 51 wherein said second section includes a compiler to convert said operating program into native code for said graphic user interface program.

53. An electric arc welder as defined in claim 52 wherein said selected script file is converted into JAVA source code first as an intermediate product.

54. An electric arc welder as defined in claim 46, wherein said desired waveform is provided as a pre-built waveform template, and the desired waveform is configured to be edited to the waveform to be implemented by the welder.

55. An electric arc welder for creating a welding cycle with a real time current waveform constituting several control parameters by a microprocessor and an operating program, that controls a power supply by a signal so the output of the power supply traces a desired waveform defined by said control parameters, said welder having a controller for creating said signal and reading said parameters, a graphic user interface computer controlled by input from a dedicated computer platform, a system with a first interface for an interactive display for displaying said desired waveform and at least one manipulative control parameter, a second interface for a manual data entry device to change said waveform and/or said parameters and a communication link for causing said welder to perform said desired waveform by controlling said signal, a number of script language files, which are text files containing specifications of welding waveforms for defining a given type of waveform and containing a user manipulative variable table of control parameters and an input stage for processing a selected one of said script files into graphic user interface components for operating said welder, wherein the selected script file is used to modify the desired waveform while not altering the operating program which controls the welder.

56. An electric arc welder as defined in claim 55 wherein said graphic interface computer contains a JAVA virtual machine.

57. An electric arc welder as defined in claim 56 wherein said input stage is a compiler to convert said selected file to a JAVA bytecode.

58. An electric arc welder as defined in claim 57 herein said input stage is a compiler to convert said selected file to a native code.

59. An electric arc welder as defined in claim 56 wherein said input stage is an interpreter.

60. An electric arc welder as defined in claim 55 wherein said input stage is an interpreter.

61. An electric arc welder as defined in claim 55, wherein said desired waveform is provided as a pre-built waveform template, and the desired waveform is configured to be edited to the waveform to be performed by the welder.

62. An electric arc welder for creating a welding cycle with a real time current waveform constituting several control parameters by a microprocessor that controls a power supply by a signal so the output of the power supply traces a desired waveform defined by said control parameters, said welder having a controller and an operating program, for creating said signal and reading said parameters, a graphic user interface controlled by input from a graphic interface computer, a system with a first interface for an interactive display for displaying said desired waveform and at least one manipulative control parameter, a second interface for a manual data entry device to change said waveform and/or said parameters and a communication link for causing said welder to perform said desired waveform by controlling said signal, a number of script language files, which are text files containing specifications of welding waveforms for defining a given type of waveform and containing a graphical construction program to display a waveform to be implemented by said welder, and an input stage for directing a selected one of said script files to said dedicated platform for operating said welder, wherein the selected script file is used to modify the desired waveform while not altering the operating program which controls the welder.

63. An electric arc welder as defined in claim 62 wherein said graphic interface computer platform is a JAVA virtual machine.

64. An electric arc welder as defined in claim 63 wherein said input stage is a compiler to convert said selected file to a native code.

65. An electric arc welder as defined in claim 63 wherein said input stage is a compiler to convert said selected file to a native code.

66. An electric arc welder as defined in claim 63 wherein said input stage is an interpreter.

67. An electric arc welder as defined in claim 62 wherein said input stage is an interpreter.

68. An electric arc welder as defined in claim 62, wherein said desired waveform is provided as a pre-built waveform template, and the desired waveform is configured to be edited to the waveform to be implemented by the welder.

69. A method of controlling an electric arc welder for creating a welding cycle with a real time current waveform constituting several control parameters by a microprocessor and an operating program, that controls a power supply by a signal so the output of the power supply traces a desired waveform defined by said control parameters, said welder having a controller for creating said signal and reading said parameters, said method comprising:

(a) providing an operating computer system controlled by input from a graphic interface computer, (b) providing a system with a first interface for an interactive display for displaying said desired waveform and at least one manipulative control parameter, a second interface for a manual data entry device to change said waveform and/or said parameters and an I/O connection for causing said welder to perform said desired waveform by controlling said signal, (c) providing a number of script language files, which are text files containing specifications of welding waveforms for defining a given type of waveform and containing a user manipulative variable table of control parameters and/or a graphical construction program to display a waveform to be implemented by said welder, and, (d) directing a selected one of said script files to said graphic interface computer for operating said welder, wherein the selected script file is used to modify the desired waveform while not altering the operating program which controls the welder.

70. A method as defined in claim 69 wherein said graphic interface computer contains a JAVA virtual machine.

71. A method as defined in claim 70 wherein said directing includes compiling said selected script file to a JAVA bytecode.

72. A method as defined in claim 71 further including:
   (e) converting said selected script file into JAVA source code.

73. A method as defined in claim 70 wherein said directing includes interpreting said selected script file.

74. A method as defined in claim 73 further including:
   (e) converting said selected script file into JAVA source code.

75. A method as defined in claim 70 further including:
   (e) converting said selected script file into JAVA source code.

76. A method as defined in claim 69 wherein said directing includes compiling said selected file to a code native to the platform.

77. A method as defined in claim 69 wherein said directing includes interpreting said selected script file.

78. A method as defined in claim 69, wherein said desired waveform is provided as a pre-built waveform template, and the desired waveform is configured to be edited to the waveform to be implemented by said welder.

79. An electric arc welder for creating a welding cycle with a real time current waveform constituting several control parameters by a microprocessor and an operating program, that controls a power supply by a signal so the output of the power supply traces a desired waveform in accordance with variables and waveform logic, said welder having a real time controller for creating said signal and reading at least some of said parameters, a number of script language files, which are text files containing specifications of welding waveforms for defining a given type waveform and containing a variable table and waveform logic in script language, a compiler to convert said variable table to native data structure of said real time control and said waveform logic into native code of said real time control and a stage to use said variable table code and said waveform logic code to operate said power supply of said welder by converting said script language file into a graphic user interface component to accompany said waveform logic and data structure, wherein the script language file is used to modify the desired waveform while not altering the operating program which controls the welder.

80. An electric arc welder as defined in claim 79 wherein said power supply is a switching power supply.

81. An electric arc welder as defined in claim 80 wherein said power supply is controlled by a pulse width modulator.

82. An electric arc welder as defined in claim 81 wherein said power supply includes a switch control operated at least about an 18 kHz switching frequency.

83. An electric arc welder as defined in claim 80 wherein said power supply includes a switch control operated at least about an 18 kHz switching frequency.

84. An electric arc welder as defined in claim 79, wherein said desired waveform is provided as a pre-built waveform template, and the desired waveform is configured to be edited to the waveform to be implemented by the welder.

* * * * *